(12) United States Patent
Balakrishnan et al.

(10) Patent No.: US 11,665,777 B2
(45) Date of Patent: May 30, 2023

(54) SYSTEM AND METHOD USING COLLABORATIVE LEARNING OF INTERFERENCE ENVIRONMENT AND NETWORK TOPOLOGY FOR AUTONOMOUS SPECTRUM SHARING

(71) Applicant: Intel Corporation, Santa Clara, CA (US)

(72) Inventors: Ravikumar Balakrishnan, Beaverton, OR (US); Nageen Himayat, Fremont, CA (US); Yiting Liao, Sunnyvale, CA (US); Gabriel Arrobo Vidal, Hillsboro, OR (US); Roya Doostnejad, Los Altos, CA (US); Vijay Sarathi Kesavan, Portland, OR (US); Venkatesan Nallampatti Ekambaram, San Diego, CA (US); Maria Ramirez Loaiza, Beaverton, OR (US); Vallabhajosyula S. Somayazulu, Portland, OR (US); Srikathyayani Srikanteswara, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 174 days.

(21) Appl. No.: 17/251,117

(22) PCT Filed: Sep. 28, 2018

(86) PCT No.: PCT/US2018/053530
§ 371 (c)(1),
(2) Date: Dec. 10, 2020

(87) PCT Pub. No.: WO2020/068127
PCT Pub. Date: Apr. 2, 2020

(65) Prior Publication Data
US 2021/0258988 A1    Aug. 19, 2021

(51) Int. Cl.
*H04W 72/12*    (2023.01)
*H04W 72/1263*    (2023.01)
(Continued)

(52) U.S. Cl.
CPC ...... *H04W 72/1263* (2013.01); *G06K 9/6262* (2013.01); *G06N 3/08* (2013.01);
(Continued)

(58) Field of Classification Search
CPC . H04W 72/1263; H04W 16/14; H04W 24/02; H04W 24/10; H04W 72/0446;
(Continued)

(56) References Cited

U.S. PATENT DOCUMENTS 11,375,527 B1 *   6/2022   Eyuboglu ......... H04W 72/1273
2017/0250741 A1   8/2017   Zummo et al.
(Continued)

FOREIGN PATENT DOCUMENTS

CN         105228180 A  *  1/2016   ............ H04W 24/02
WO         WO-2018071456 A1    4/2018
(Continued)

OTHER PUBLICATIONS

Chakchouk, "A Survey of Opportunistic Routing in Wireless Communication Networks", 2015, IEEE Communication Surveys & Tutorials, IEEE, vol. 17, No. 4, pp. 2214-2241 (Year: 2015).*
(Continued)

*Primary Examiner* — Michael K Phillips
(74) *Attorney, Agent, or Firm* — Schwegman Lundberg & Woessner, P.A.

(57) ABSTRACT

Systems and methods of using machine-learning to improve communications across different networks are described. A CIRN node identifies whether it is within range of a source and destination node in a different network using explicit information or a machine-learning classification model. A
(Continued)

neural network is trained to avoid interference using rewards associated with reduced interference or retransmission levels in each network or improved throughput at the CIRN node. A machine-learning scheduling algorithm determines a relay mode of the CIRN node for source and destination node transmissions. The scheduling algorithm is based on the probability of successful transmission between the source and destination nodes multiplied by a collaboration score for successful transmission and the probability of unsuccessful transmission of the particular packet multiplied by a collaboration score for unsuccessful transmission.

25 Claims, 12 Drawing Sheets

(51) Int. Cl.
| | |
|---|---|
| *G06K 9/62* | (2022.01) |
| *G06N 3/08* | (2023.01) |
| *H04W 16/14* | (2009.01) |
| *H04W 24/02* | (2009.01) |
| *H04W 24/10* | (2009.01) |
| *H04W 72/0446* | (2023.01) |
| *H04W 88/04* | (2009.01) |

(52) U.S. Cl.
CPC ............ *H04W 16/14* (2013.01); *H04W 24/02* (2013.01); *H04W 24/10* (2013.01); *H04W 72/0446* (2013.01); *H04W 72/1231* (2013.01); *H04W 88/04* (2013.01)

(58) Field of Classification Search
CPC ............. H04W 72/1231; H04W 88/04; G06K 9/6262; G06N 3/08; G06N 3/086; G06N 3/126; G06N 5/003; G06N 7/005; G06N 20/10; G06N 20/20; G06N 3/006; G06N 3/0445; G06N 3/084; G06N 3/088
See application file for complete search history.

(56) References Cited

U.S. PATENT DOCUMENTS

| | | | | |
|---|---|---|---|---|
| 2017/0331670 A1* | 11/2017 | Parkvall | ............ | H04W 52/0229 |
| 2020/0236560 A1* | 7/2020 | Zhao | .................... | H04W 16/10 |
| 2021/0051501 A1* | 2/2021 | Koudouridis | ..... | H04W 72/0406 |

FOREIGN PATENT DOCUMENTS

| | | | | |
|---|---|---|---|---|
| WO | WO-2020068127 A1 * | 4/2020 | ........... | G06K 9/6262 |
| WO | WO-2020068127 A1 | 4/2020 | | |

OTHER PUBLICATIONS

"International Application Serial No. PCT/US2018/053530, International Search Report dated Jun. 26, 2019", 4 pgs.

"International Application Serial No. PCT/US2018/053530, Written Opinion dated Jun. 26, 2019", 4 pgs.

Pozza, Riccardo, et al., "Neighbor Discovery for Opportunistic Networking in Internet of Things Scenarios", In: IEEE Access, vol. 3, Artificial Intelligence Enabled Networking, [Online] Retrieved from the internet: <https://ieeexplore.ieee.org/abstract/document/7159017>, (Jul. 15, 2015), 1102-1123.

Sankhe, Kunal, et al., "Machine Learning Based Cooperative Relay Selection in Virtual MIMO", In: WTS (Wireless Telecommunications Symposium) 2015 proceedings, [Online] Retrieved from the internet: <http://adsabs.harvard.edu/abs/2015arXiv150601910S>, (Jun. 2015).

Wang, Liping, et al., "On the Gain of Primary Exclusion Region and Vertical Cooperation in Spectrum Sharing Wireless Network", In: IEEE Transactions on Vehicular Technology, vol. 61, issue 8, [Online] Retrieved from the internet: <https://ieeexplore.ieee.org/abstract/document/6232470>, (Jul. 5, 2012), 3746-3749.

* cited by examiner

SYSTEM AND METHOD USING COLLABORATIVE LEARNING OF INTERFERENCE ENVIRONMENT AND NETWORK TOPOLOGY FOR AUTONOMOUS SPECTRUM SHARING

This patent application is a U.S. National Stage Filing under 35 U.S.C. 371 from international Application No. PCT/US2018/053530, filed Sep. 28, 2018 and published in English as WO 2020/068127 on Apr. 2, 2020, which is hereby incorporated by reference herein in its entirety.

TECHNICAL FIELD

Aspects pertain to radio access networks (RANs). Some aspects relate to cellular and wireless local area network (WLAN) networks, including Third Generation Partnership Project Long Term Evolution (3GPP LTE) networks and LTE advanced (LTE-A) networks as well as legacy networks, $4^{th}$ generation (4G) networks and $5^{th}$ generation (5G) networks. Some aspects relate to autonomous spectrum sharing based on collaborative learning models.

BACKGROUND

Network use continues to increase due to both an increase in the types of devices user equipment (UEs) using network resources as well as the amount of data and bandwidth being used by various applications on individual devices, such as video streaming, operating on these UEs. With the explosion of network usage, making intelligent use of the network resources has become increasingly desirable due to the limited availability of bandwidth.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1:
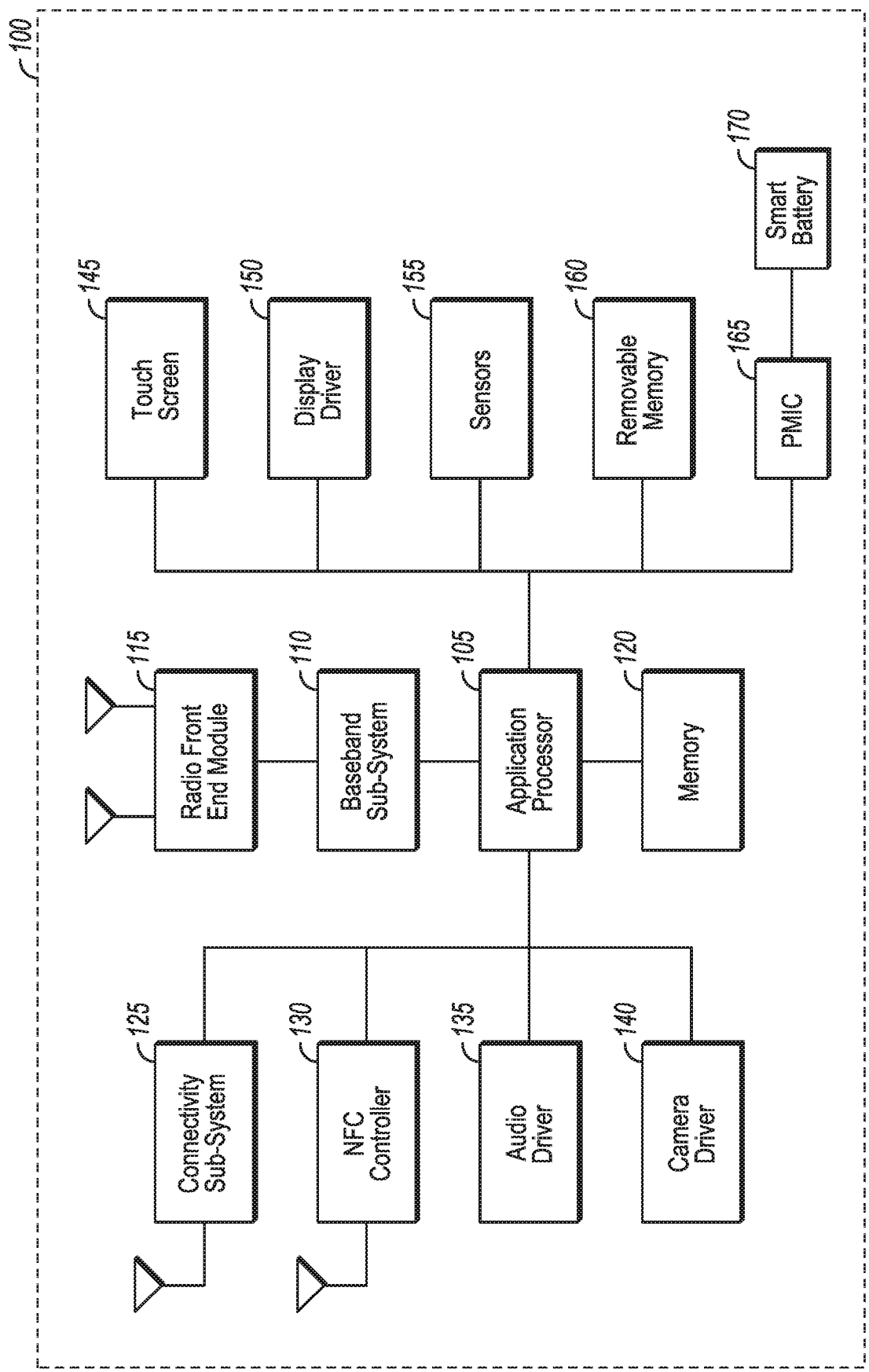
FIG. 1 illustrates a UE in accordance with some aspects.

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Any of the radio links described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced. Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LIE), 3GPP Long Term Evolution Advanced (LIE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA). 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE, Advanced. Pro, LIE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)). Push-to-talk (PIT), Mobile Telephone System (MTS), Improved Mobile Telephone System (IATS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NIT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (12V) communication technologies, 3GPP cellular V2X, DSRC (Dedicated Short Range Communications) communication systems such as Intelligent-Transport-Systems and others.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WIGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1 illustrates a UE in accordance with some aspects. The user device 100 may be a mobile device in some aspects and includes an application processor 105, baseband processor 110 (also referred to as a baseband sub-system), radio front end module (RFEM) 115, memory 120, connectivity sub-system 125, near field communication (NEC) controller 130, audio driver 135, camera driver 140, touch screen 145, display driver 150, sensors 155, removable memory 160, power management integrated circuit (PMIC) 165 and smart battery 170.

In some aspects, application processor 105 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-Output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 110 may be implemented, for example, as a solder-down substrate including one or more integrated to circuits, a single packaged integrated circuit soldered to a main circuit board, and/or a multi-chip module containing two or more integrated circuits.

Figure 2:
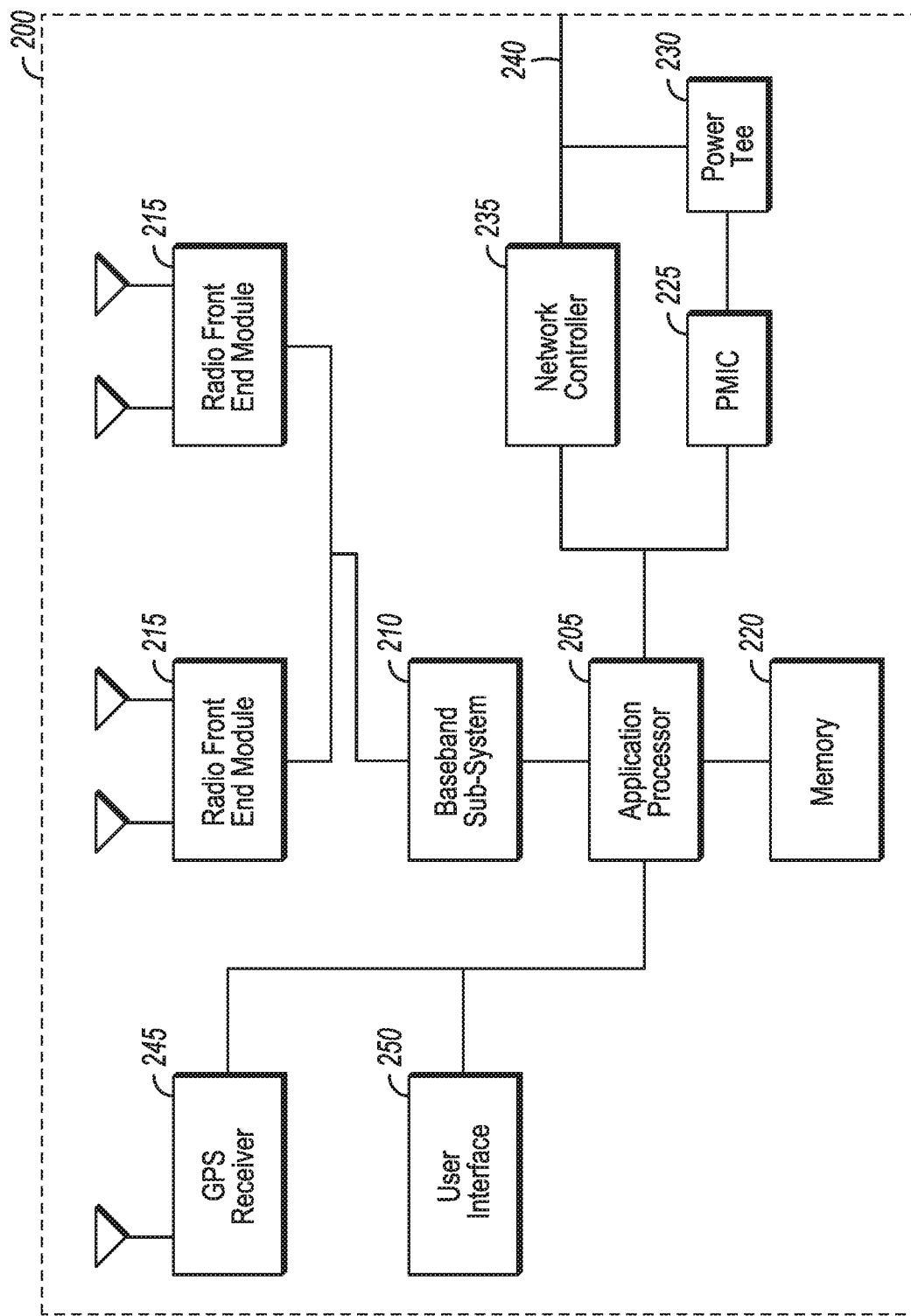
FIG. 2 illustrates a base station or infrastructure equipment radio head in accordance with some aspects.

FIG. 2 illustrates a base station in accordance with some aspects. The base station radio head 200 may include one or more of application processor 205, baseband processor 210, one or more radio front end modules 215, memory 220, power management circuitry 225, power tee circuitry 230, network controller 235, network interface connector 240, satellite navigation receiver 245, and user interface 250.

In some aspects, application processor 205 may include one or more CPU cores and one or more of cache memory, low drop-out voltage regulators (LDOs), interrupt controllers, serial interfaces such as SPI, $I^2C$ or universal programmable serial interface, real time clock (RTC), timer-counters including interval and watchdog timers, general purpose 10, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip module containing two or more integrated circuits.

In some aspects, memory 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 220 may be implemented as one or more of solder down packaged integrated circuits, socketed memory modules and plug-in memory cards.

In some aspects, power management circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable to provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide data to application processor 205 which may include one or more of position data or time data. Application processor 205 may use time data to synchronize operations with other radio base stations.

In some aspects, user interface 250 may include one or more of physical or virtual buttons, such as a reset button, one or more indicators such as light emitting diodes (LEDs) and a display screen.

A radio front end module may incorporate a millimeter wave radio front end module (RFEM) and one or more sub-millimeter wave radio frequency integrated circuits (RHO. In this aspect, the one or more sub-millimeter wave RFICs may be physically separated from a millimeter wave RFEM. The RFICs may include connection to one or more antennas. The RFEM may be connected to multiple antennas. Alternatively both millimeter wave and sub-millimeter wave radio functions may be implemented in the same physical radio front end module. Thus, the RFEM may incorporate both millimeter wave antennas and sub-millimeter wave antennas.

Figure 3:
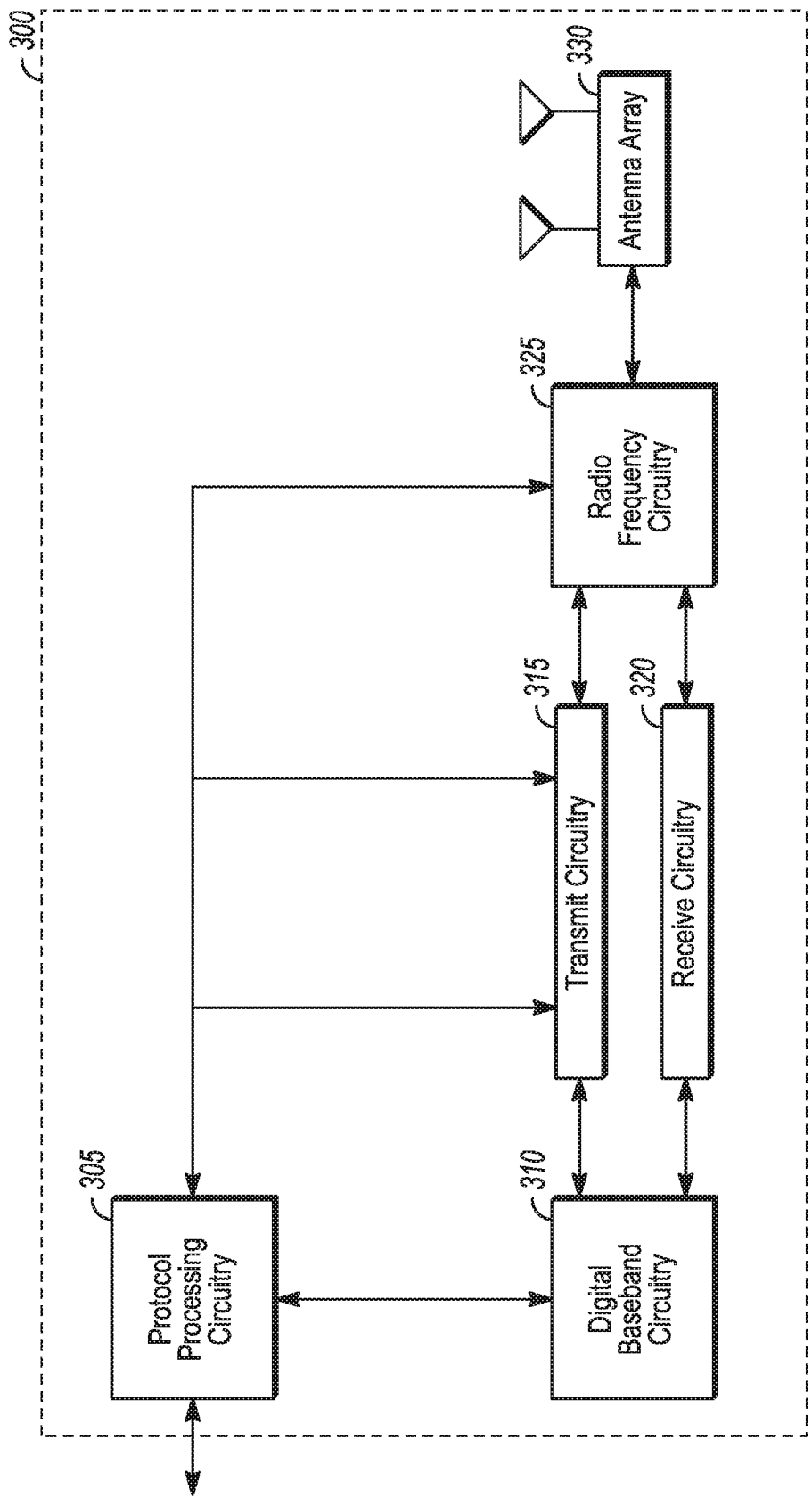
FIG. 3 illustrates millimeter wave communication circuitry in accordance with some aspects.

FIG. 3 illustrates millimeter wave communication circuitry in accordance with some aspects. Circuitry 300 is alternatively grouped according to functions. Components as shown in 300 are shown here for illustrative purposes and may include other components not shown here.

Millimeter wave communication circuitry 300 may include protocol processing circuitry 305, which may implement one or more of medium access control (MAC), radio link control (RLC), packet data convergence protocol (PDCP), radio resource control (RRC) and non-access stratum (NAS) functions. Protocol processing circuitry 305 may include one or more processing cores (not shown) to execute instructions and one or more memory structures (not shown) to store program and data information.

Millimeter wave communication circuitry 300 may further include digital baseband circuitry 310, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330.

Millimeter wave communication circuitry 300 may further include radio frequency (RF) circuitry 325. In an aspect, RF circuitry 325 may include multiple parallel RF chains for one or more of transmit or receive functions, each connected to one or more antennas of the antenna array 330.

In an aspect of the disclosure, protocol processing circuitry 305 may include one or more instances of control circuitry (not shown) to provide control functions for one or more of digital baseband circuitry 310, transmit circuitry 315, receive circuitry 320, and/or radio frequency circuitry 325.

The transmit circuitry of may include one or more of digital to analog converters (DACs), analog baseband circuitry, up-conversion circuitry and filtering and amplification circuitry, the latter of which may provide an amount of amplification that is controlled by an automatic gain control (AGC). In another aspect, the transmit circuitry may include digital transmit circuitry and output circuitry.

The radio frequency circuitry may include one or more instances of radio chain circuitry, which in some aspects may include one or more filters, power amplifiers, low noise amplifiers, programmable phase shifters and power supplies. The radio frequency circuitry may include power combining and dividing circuitry in some aspects. In some aspects, the power combining and dividing circuitry may operate bidirectionally, such that the same physical circuitry may be configured to operate as a power divider when the device is transmitting, and as a power combiner when the device is receiving. In some aspects, the power combining and dividing circuitry may one or more include wholly or partially separate circuitries to perform power dividing when the device is transmitting and power combining when the device is receiving. In some aspects, the power combining and dividing circuitry may include passive circuitry comprising one or more two-way power divider/combiners arranged in a tree. In some aspects, the power combining and dividing circuitry may include active circuitry comprising amplifier circuits.

In some aspects, the radio frequency circuitry may connect to transmit circuitry and receive circuitry via one or more radio chain interfaces or a combined radio chain interface. In some aspects, one or more radio chain interfaces may provide one or more interfaces to one or more receive or transmit signals, each associated with a single antenna structure which may comprise one or more antennas.

In some aspects, the combined radio chain interface may provide a single interface to one or more receive or transmit signals, each associated with a group of antenna structures comprising one or more antennas.

The receive circuitry may include one or more of parallel receive circuitry and/or one or more of combined receive circuitry. In some aspects, the one or more parallel receive circuitry and one or more combined receive circuitry may include one or more Intermediate Frequency (IF) down-conversion circuitry, IF processing circuitry, baseband down-conversion circuitry, baseband processing circuitry and analog-to-digital converter (ADC) circuitry.

In an aspect, the RF circuitry may include one or more of each of IF interface circuitry, filtering circuitry, upconversion and downconversion circuitry, synthesizer circuitry, filtering and amplification circuitry, power combining and dividing circuitry and radio chain circuitry.

In an aspect, the baseband processor may contain one or more digital baseband systems. In an aspect, the one or more digital baseband subsystems may be coupled via an interconnect subsystem to one or more of a CPU subsystem, audio subsystem and interface subsystem. In an aspect, the one or more digital baseband subsystems may be coupled via another interconnect subsystem to one or more of each of digital baseband interface and mixed-signal baseband sub-system. In an aspect, the interconnect subsystems may each include one or more of each of buses point-to-point connections and network-on-chip (NOC) structures.

In an aspect, an audio sub-system may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, a mixed signal baseband sub-system may include one or more of an IF interface, analog IF subsystem, downconverter and upconverter subsystem, analog baseband subsystem, data converter subsystem, synthesizer and control sub-system.

A baseband processing subsystem may include one or more of each of DSP sub-systems, interconnect sub-system, boot loader sub-system, shared memory sub-system, digital I/O sub-system, digital baseband interface sub-system and audio sub-system. In an example aspect, the baseband processing subsystem may include one or more of each of an accelerator subsystem, buffer memory, interconnect sub-system, audio sub-system, shared memory sub-system, digital I/O subsystem, controller sub-system and digital baseband interface sub-system.

In an aspect, the boot loader sub-system may include digital logic circuitry configured to perform configuration of the program memory and running state associated with each of the one or more DSP sub-systems. The configuration of the program memory of each of the one or more DSP sub-systems may include loading executable program code from storage external to baseband processing sub-system. The configuration of the running state associated with each of the one or more DSP sub-systems may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, the shared memory sub-system may include one or more of a read-only memory (ROM), static random access memory (SRAM), embedded dynamic random access memory (eDRAM) and non-volatile random access memory (NVRAM). In an aspect, the digital I/O subsystem may include one or more of serial interfaces such as VC, SPI or other 1, 2 or 3-wire serial interfaces, parallel interfaces such as general-purpose input-output (GPIO), register access interfaces and direct memory access (DMA). In an aspect, a register access interface implemented in digital I/O subsystem may permit a microprocessor core external to baseband processing subsystem (1000 cross reference) to read and/or write one or more of control and data registers and memory. In an aspect, DMA logic circuitry implemented in digital I/O subsystem may permit transfer of contiguous blocks of data between memory locations including memory locations internal and external to baseband processing subsystem. In an aspect, the digital baseband interface sub-system may provide for the transfer of digital baseband samples between the baseband processing subsystem and mixed signal baseband or radio-frequency circuitry external to the baseband processing subsystem. In an aspect, the digital baseband samples transferred by the digital baseband interface sub-system may include in-phase and quadrature (I/Q) samples.

In an aspect, the controller sub-system may include one or more of each of control and status registers and control state machines. In an aspect, the control and status registers may be accessed via a register interface and may provide for one or more of starting and stopping operation of control state machines, rescuing control state machines to a default state, configuring optional processing features, configuring the generation of interrupts and reporting the status of operations. In an aspect, each of the one or more control state machines may control the sequence of operation of each of the one or more accelerator sub-systems.

In an aspect, the DSP sub-system may include one or more of each of a DSP core sub-system, local memory, direct memory access sub-system, accelerator sub-system, external interface sub-system, power management unit and interconnect sub-system. In an aspect, the local memory may include one or more of each of read-only memory, static random access memory or embedded dynamic random access memory. In an aspect, the direct memory access sub-system may provide registers and control state machine circuitry adapted to transfer blocks of data between memory locations including memory locations internal and external to the digital signal processor sub-system. In an aspect, the external interface sub-system may provide for access by a microprocessor system external to DSP sub-system to one or more of memory, control registers and status registers which may be implemented in the DSP sub-system. In an aspect, the external interface sub-system may provide for transfer of data between local memory and storage external to the DSP sub-system under the control of one or more of the DMA sub-system and DSP core sub-system.

Figure 4:
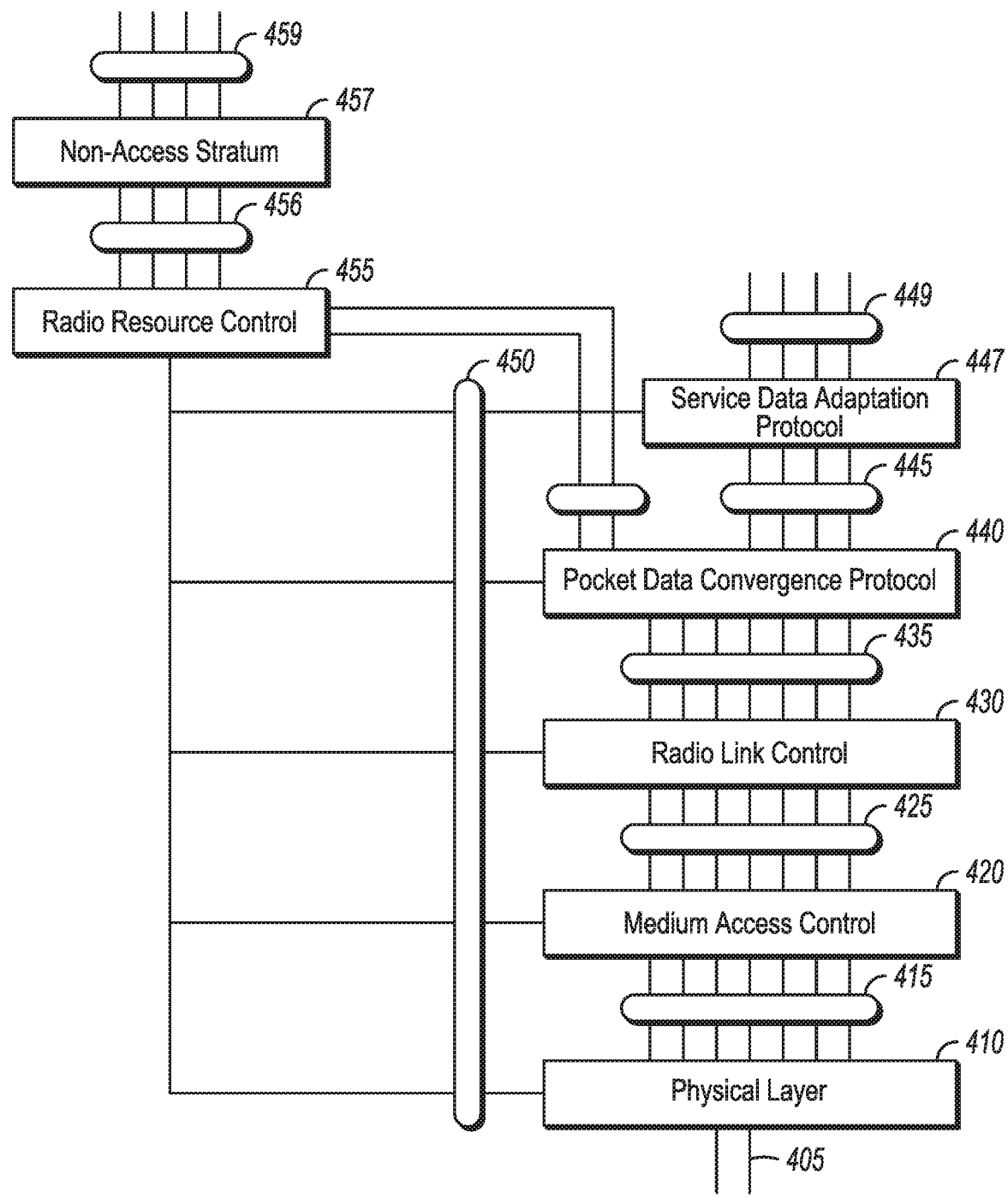
FIG. 4 is an illustration of protocol functions in accordance with some aspects.

FIG. 4 is an illustration of protocol functions in accordance with some aspects. The protocol functions may be implemented in a wireless communication device according to some aspects. In some aspects, the protocol layers may include one or more of physical layer (PHY) 410, medium access control layer (MAC) 420, radio link control layer (RLC) 430, packet data convergence protocol layer (PDCP) 440, service data adaptation protocol (SDAP) layer 447, radio resource control layer (RRC) 455, and non-access stratum (NAS) layer 457, in addition to other higher layer functions not illustrated.

According to some aspects, the protocol layers may include one or more service access points that may provide communication between two or to more protocol layers. According to some aspects, the PHY 410 may transmit and receive physical layer signals 405 that may be received or transmitted respectively by one or more other communication devices. According to some aspects, physical layer signals 405 may comprise one or more physical channels.

According to some aspects, an instance of PHY 410 may process requests from and provide indications to an instance of MAC 420 via one or more physical layer service access points (PHY-SAP) 415. According to some aspects, requests and indications communicated via PHY-SAP 415 may comprise one or more transport channels.

According to some aspects, an instance of MAC 420 may process requests from and provide indications to an instance of RLC 430 via one or more medium access control service access points (MAC-SAP) 425. According to some aspects, requests and indications communicated via MAC-SAP 425 may comprise one or more logical channels.

According to some aspects, an instance of RLC 430 may process requests from and provide indications to an instance of PDCP 440 via one or more radio link control service access points (RLC-SAP) 435. According to some aspects, requests and indications communicated via RLC-SAP 435 may comprise one or more RLC channels.

According to some aspects, an instance of PDCP 440 may process requests from and provide indications to one or more of an instance of RRC 455 and one or more instances of SDAP 447 via one or more packet data convergence protocol service access points (PDCP-SAP) 445. According to some aspects, requests and indications communicated via PDCP-SAP 445 may comprise one or more radio bearers.

According to some aspects, an instance of SDAP 447 may process requests from and provide indications to one or more higher layer protocol entities via one or more service data adaptation protocol service access points (SDAP-SAP) 449. According to some aspects, requests and indications communicated via SDAP-SAP 449 may comprise one or more quality of service (QoS) flows.

According to some aspects, RRC entity 455 may configure, via one or more management service access points (M-SAP), aspects of one or more protocol layers, which may include one or more instances of PHY 410, MAC 420, RLC 430, PDCP 440 and SDAP 447. According to some aspects, an instance of RRC 455 may process requests from and provide indications to one or more NAS entities via one or more RRC service access points (RRC-SAP) 456.

Figure 5:
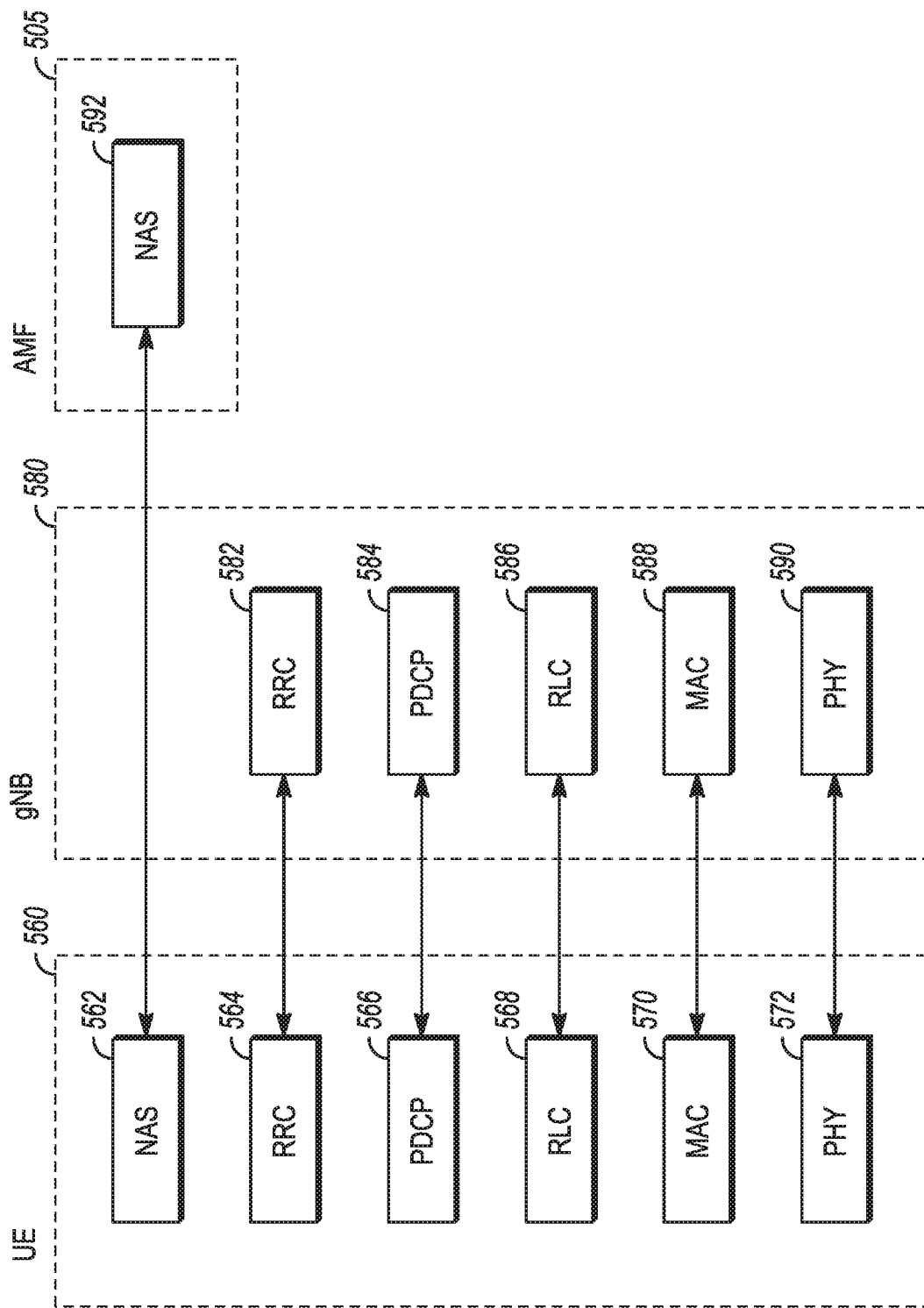
FIG. 5 is an illustration of protocol entities in accordance with some aspects.

FIG. 5 is an illustration of protocol entities in accordance with some aspects. The protocol entities may be implemented in wireless communication devices, including one or more of a user equipment (UE) 560, a base station, which may be termed an evolved node B (eNB), or new radio node B (gNB) 580, and a network function, which may be termed a mobility management entity (MME), or an access and mobility management function (AMF) 505, according to some aspects.

According to some aspects, gNB 580 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAM).

According to some aspects, one or more protocol entities that may be implemented in one or more of UE 560, gNB 580 and AMF 505, may be described as implementing all or part of a protocol stack in which the layers are considered to be ordered from lowest to highest in the order PHY, MAC, RLC, PDCP, RRC and NAS, According to some aspects, one or more protocol entities that may be implemented in one or more of UE 560, gNB 580 and AMF 505, may communicate with a respective peer protocol entity that may be implemented on another device, using the services of respective lower layer protocol entities to perform such communication.

According to some aspects, UE PHY 572 and peer entity gNB PHY 590 may communicate using signals transmitted and received via a wireless medium. According to some aspects, UE MAC 570 and peer entity gNB MAC 588 may communicate using the services provided respectively by UE PHY 572 and gNB PHY 590. According to some aspects, UE RLC 568 and peer entity gNB RLC 586 may communicate using the services provided respectively by UE MAC 570 and gNB MAC 588. According to some aspects, UE PDCP 566 and peer entity gNB PDCP 584 may communicate using the services provided respectively by UE RLC 568 and 5GNB RLC 586. According to some aspects, UE RRC 564 and gNB RRC 582 may communicate using the services provided respectively by UE PDCP 566 and gNB PDCP 584. According to some aspects, UE NAS 562 and AMF NAS 592 may communicate using the services provided respectively by UE RRC 564 and gNB RRC 582.

The UE and gNB may communicate using a radio frame structure that has a predetermined duration and repeats in a periodic manner with a repetition interval equal to the predetermined duration. The radio frame may be divided into two or more subframes. In an aspect, subframes may be of predetermined duration which may be unequal. In an alternative aspect, subframes may be of a duration which is determined dynamically and varies between subsequent repetitions of the radio frame. In an aspect of frequency division duplexing (FDD), the downlink radio frame structure is transmitted by a base station to one or devices, and uplink radio frame structure transmitted by a combination of one or more devices to a base station. The radio frame may have a duration of 10 ms. The radio frame may be divided into slots each of duration 0.5 ms, and numbered from 0 to 19. Additionally, each pair of adjacent slots numbered 2i and 2i+1 where i is an integer, may be referred to as a subframe. Each subframe may include a combination of one or more of downlink control information, downlink data information, uplink control information and uplink data information. The combination of information types and direction may be selected independently for each subframe.

According to some aspects, the downlink frame and uplink frame may have a duration of 10 ms, and uplink frame may be transmitted with a timing advance with respect to downlink frame. According to some aspects, the downlink frame and uplink frame may each be divided into two or more subframes, which may be 1 ms in duration. According to some aspects, each subframe may consist of one or more slots. In some aspects, the time intervals may be represented in units of $T_s$. According to some aspects, T may be defined to as $1/(30{,}720 \times 1000)$ seconds. According to some aspects, a radio frame may be defined as having duration $30{,}720 \cdot T_s$, and a slot may be defined as having duration $15{,}360 \cdot T_s$. According to some aspects, $T_s$ may be defined as $$T_s = 1/(\Delta f_{max} \cdot N_f),$$

where $\Delta f_{max} = 480 \times 10^3$ and Nf=4,096. According to some aspects E, the number of slots may be determined based on a numerology parameter, which may be related to a frequency spacing between subcarriers of a multicarrier signal used for transmission.

Constellation designs of a single carrier modulation scheme that may be transmitted or received may contain 2 points, known as binary phase shift keying (BPSK), 4 points, known as quadrature phase shift keying (QPSK), 16 points, known as quadrature amplitude modulation WAND with 16 points (16QAM or QAM16) or higher order modulation constellations, containing for example 64, 256 or 1024 points. In the constellations, the binary codes are assigned to the points of the constellation using a scheme such that nearest-neighbor points, that is, pairs of points separated from each other by the minimum Euclidian distance, have an assigned binary code differing by only one binary digit. For example, the point assigned code 1000 has nearest neighbor points assigned codes 1001, 0000, 1100 and 1010, each of which differs from 1000 by only one bit.

Alternatively, the constellation points may be arranged in a square grid, and may be arranged such that there is an equal distance on the in-phase and quadrature plane between each pair of nearest-neighbor constellation points. In an aspect, the constellation points may be chosen such that there is a pre-determined maximum distance from the origin of the in-phase and quadrature plane of any of the allowed constellation points, the maximum distance represented by a circle. In an aspect, the set of allowed constellation points may exclude those that would fall within square regions at the corners of a square grid. The constellation points are shown on orthogonal in-phase and quadrature axes, representing, respectively, amplitudes of sinusoids at the carrier frequency and separated in phase from one another by 90 degrees. In an aspect, the constellation points are grouped into two or more sets of constellation points, the points of each set being arranged to have an equal distance to the origin of the in-phase and quadrature plane, and lying on one of a set of circles centered on the origin.

To generate multicarrier baseband signals for transmission, data may be input to an encoder to generate encoded data. The encoder may include a combination of one or more of error detecting, error correcting, rate matching, and interleaving. The encoder may further include a step of scrambling. In an aspect, encoded data may be input to a modulation mapper to generate complex valued modulation symbols. The modulation mapper may map groups containing one or more binary digits, selected from the encoded data, to complex valued modulation symbols according to one or more mapping tables. In an aspect, complex-valued modulation symbols may be input to the layer mapper to be mapped to one or more layer mapped modulation symbol streams.

Representing a stream of modulation symbols 440 as d(i) where i represents a sequence number index, and the one or more streams of layer mapped symbols as $x^{(k)}(i)$ where k represents a stream number index and i represents a sequence number index, the layer mapping function for a single layer may be expressed as:

$x^{(0)}(i)=d(i)$ and the layer mapping for two layers may be expressed as:

$x^{(0)}(i)=d(2i)=$ $x^{(1)}(i)=d(2i+1)$

Layer mapping may be similarly represented for more than two layers.

In an aspect, one or more streams of layer mapped symbols may be input to the precoder which generates one or more streams of precoded symbols. Representing the one or more streams of layer mapped symbols as a block of vectors:

$[x^{(0)}(i) \ldots x^{(\upsilon-1)}(i)]^T$ where i represents a sequence number index in the range 0 to $M_{symb}^{layer}-1$ the output is represented as a block of vectors:

$[z^{(0)}(i) \ldots z^{(P-1)}(i)]^T$ where i represents a sequence number index in the range 0 to $M_{symb}^{ap}-1$. The precoding operation may be configured to include one of direct mapping using a single antenna port, transmit diversity using space-time block coding, or spatial multiplexing.

In an aspect, each stream of precoded symbols may be input to a resource mapper which generates a stream of resource mapped symbols. The resource mapper may map precoded symbols to frequency domain subcarriers and time domain symbols according to a mapping which may include contiguous block mapping, randomized mapping or sparse mapping according to a mapping code.

In an aspect, the resource mapped symbols may be input to multicarrier generator which generates a time domain baseband symbol. Multicarrier generator may generate time domain symbols using, for example, an inverse discrete Fourier transform (DFT), commonly implemented as an inverse fast Fourier transform (FFT) or a filter bank comprising one or more filters. In an aspect, where resource mapped symbols 455 are represented as sk(i), where k is a subcarrier index and i is a symbol number index, a time domain complex baseband symbol x(i) may be represented as:

$$x(t) = \sum_k s_k(i) p_T(t - T_{sym}) \exp[j2\pi f_k(t - T_{sym} - \tau_k)]$$

Where $p_T(t)$, is a prototype filter function, $T_{sym}$ is the start time of the symbol period, n is a subcarrier dependent time offset, and $f_k$ is the frequency of subcarrier k. Prototype functions $p_T(t)$ may be, for example, rectangular time domain pulses, Gaussian time domain pulses or any other suitable function.

In some aspects, a sub-component of a transmitted signal consisting of one subcarrier in the frequency domain and one symbol interval in the time domain may be termed a resource element. Resource elements may be depicted in a grid form. In some aspects, resource elements may be grouped into rectangular resource blocks consisting of 12 subcarriers in the frequency domain and the P symbols in the time domain, where P may correspond to the number of symbols contained in one slot, and may be 6, 7, or any other suitable number of symbols. In some alternative aspects, resource elements may be grouped into resource blocks consisting of 12 subcarriers in the frequency domain and one symbol in the time domain. Each resource element 05 may be indexed as (k, l) where k is the index number of subcarrier, in the range 0 to N·M−1, where N is the number of subcarriers in a resource block, and M is the number of resource blocks spanning a component carrier in the frequency domain.

In some aspects, coding of the signal to be transmitted may include one or more physical coding processes that may be used to provide coding for a physical channel that may encode data or control information. Coding may also include multiplexing and interleaving that generates combined coded information by combining information from one or more sources, which may include one of more of data information and control information, and which may have been encoded by one or more physical coding processes. The combined coded information may be input to a scrambler which may generate scrambled coded information. Physical coding process may include one or more of CRC attachment, code block segmentation, channel coding, rate matching and code block concatenation. An encoder that may be used to encode data according to one of a convolutional code and a tail-biting convolutional code.

A MAC entity that may be used to implement medium access control layer functions may include one or more of a controller, a logical channel prioritizing unit, a channel multiplexer & de-multiplexer, a PDU filter unit, random access protocol entity, data hybrid automatic repeat request protocol (HARQ) entity and broadcast HARQ entity. According to some aspects, a higher layer may exchange control and status messages with controller via management service access point. According to some aspects, MAC service data units (SDU) corresponding to one or more logical channels may be exchanged with the MAC entity via one or more service access points (SAP). According to some aspects, a PI-LY SDU corresponding to one or more transport channels may be exchanged with a physical layer entity via one or more SAPs. According to some aspects, the logical channel prioritization unit may perform prioritization amongst one or more logical channels, which may include storing parameters and state information corresponding to each of the one or more logical channels, that may be initialized when a logical channel is established. According to some aspects, the logical channel prioritization unit may be configured with a set of parameters for each of one or more logical channels, each set including parameters which may include one or more of a prioritized bit rate (PBR) and a bucket size duration (BSD).

According to some aspects, the multiplexer & de-multiplexer may generate MAC PDUs, which may include one or more of MAC-SDUs or partial MAC-SDUs corresponding to one or more logical channels, a MAC header which may include one or more MAC sub-headers, one or more MAC control elements, and padding data. According to some aspects, the multiplexer & de-multiplexer may separate one or more MAC-SDUs or partial MAC-SDUs contained in a received MAC PDU, corresponding to one or more logical channels, and may indicate the one or more MAC-SDUs or partial MAC-SDUs to a higher layer via one or more service access points. According to some aspects, the HARQ entity and broadcast HARQ entity may include one or more parallel HARQ processes, each of which may be associated with a HARQ identifier, and which may be one of a receive or transmit HARQ process.

According to some aspects, a transmit HARQ process may generate a transport block (TB) to be encoded by the PHY according to a specified redundancy version (RV), by selecting a MAC-PDU for transmission. According to some aspects, a transmit HARQ process that is included in a broadcast HARQ entity may retransmit a same TB in successive transmit intervals a predetermined number of times. According to some aspects, a transmit HARQ process included in a HARQ entity may determine whether to retransmit a previously transmitted TB or to transmit a new TB at a transmit time based on whether a positive acknowledgement or a negative acknowledgement was received for a previous transmission.

According to some aspects, a receive HARQ process may be provided with encoded data corresponding to one or more received TBs and which may be associated with one or more of a new data indication (NDI) and a redundancy version (RV), and the receive HARQ process may determine whether each such received encoded data block corresponds to a retransmission of a previously received TB or a not previously received TB. According to some aspects, a receive HARQ process may include a buffer, which may be implemented as a memory or other suitable storage device, and may be used to store data based on previously received data for a TB. According to some aspects, a receive HARQ process may attempt to decode a TB, the decoding based on received data for the TB, and which may be additionally be based on the stored data based on previously received data for the TB.

Figure 6:
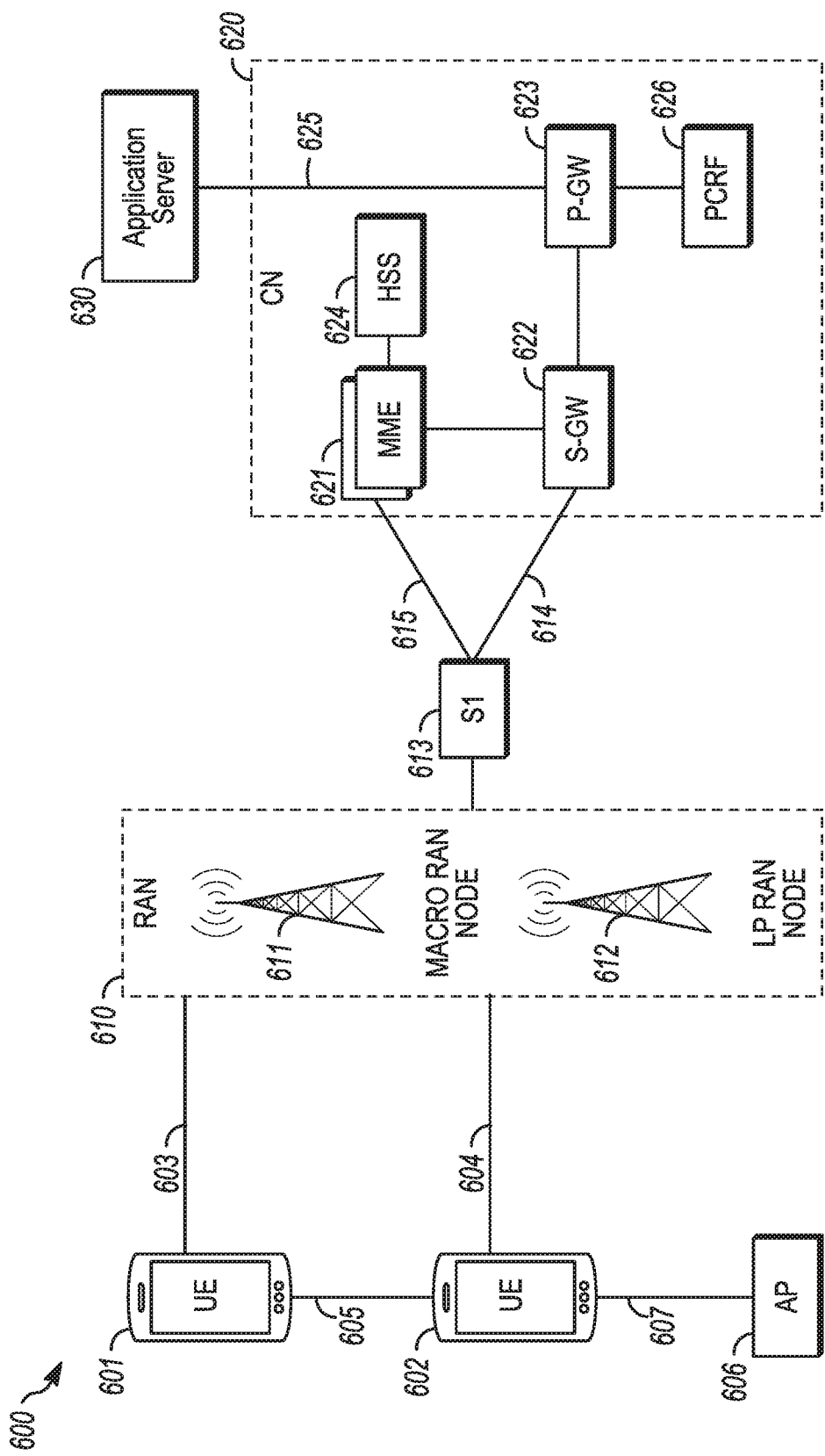
FIG. 6 illustrates an architecture of a system of a network in accordance with some aspects.

FIG. 6 illustrates an architecture of a system of a network in accordance with some aspects. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some aspects, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or MTC for exchanging data with an MTC server or device via a public land mobile network (PAIN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (5G or NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a New Radio (NR) protocol, and the like.

In this aspect, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSDCH), a Physical Sidelink Shared Channel (PSDCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some aspects, any of the RAN nodes 611 and 612 can fulfill various logical functions for the RAN

610 including, but not limited to, radio network controller (RNC) functions such as radio bearer management, uplink and downlink dynamic radio resource management and data packet scheduling, and mobility management.

In accordance with some aspects, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the aspects is not limited in this respect. The OFDM signals can comprise a plurality of orthogonal subcarriers.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed hack from any of the UEs 601 and 602. The downlink resource assignment information may be sent on the PDCCH used for (e.g., assigned to) each of the UEs 601 and 602.

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 or NG interface 613. In aspects, the CN 620 may be an evolved packet core (EPC) network, a 5GC network, or some other type of CN. In this aspect, the S1 interface 613 is split into two parts: the S1-U interface 614, Which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this aspect, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (CPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network and external networks such as a network including the application server 630 (alternatively referred to as application function (AF)) via an Internet Protocol (IP) interface 625. Generally, the application server 630 may be an element offering applications that use IP bearer resources with the core network (e.g., UNITS Packet Services (PS) domain, LTE PS data services, etc.). In this aspect, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Rules Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

The components of FIG. 6 are able to read instructions from a machine-readable or computer-readable medium (e.g., a non-transitory machine-readable storage medium) and perform any one or more of the methodologies discussed herein. In particular, the processors (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may read and follow the instructions on a non-transitory medium.

Instructions may comprise software, a program, an application, an applet, an app, or other executable code for causing at least any of the processors to perform any one or more of the methodologies discussed herein. The instructions may reside, completely or partially, within at least one of the processors e.g., within the processor's cache memory), the memory/storage devices, or any suitable combination thereof. In some aspects, the instructions may reside on a tangible, non-volatile communication device readable medium, which may include a single medium or multiple media. Furthermore, any portion of the instructions may be transferred to the hardware resources from any combination of the peripheral devices or the databases 606. Accordingly, the memory of processors, the memory/storage devices, the peripheral devices, and the databases are examples of computer-readable and machine-readable media.

The above describes the network, devices in the network, and communications in the network. The continual infusion of additional devices, such as sensors, have overloaded the spectrum; breaking the spectrum into rigid exclusively licensed bands, as done previously, may prevent dynamic adaption to the supply and demand of network resources. The addition of devices and overloading of the spectrum causes increased congestion in the network and correspondingly increases the amount of interference. Collaborative intelligent radio networks (CIRNs) and machine-learning-based solutions may be developed to address interference avoidance and other issues in the communication field. In particular, CIRNs may be used to integrate CIRN nodes (such as the UEs) into a cooperative system in which the networks and perhaps nodes therein collaborate directly with each other and make decisions based on the information obtained thereby as well as internal intelligent decision-making processes. The CIRN nodes can have different roles in the CIRN, including a relay node, gateway node or end node, as discussed in more detail below.

To this end, it may thus be desirable to develop techniques to enable a CIRN to best share spectrum with any network types, in any environment and without prior knowledge. One aspect to enable dynamic and intelligent sharing of the radio spectrum is for the networks to collaborate effectively with each other. To collaborate effectively, CIRN nodes (also referred to as agents) and networks may use a machine-learning algorithm to learn how their transmissions impact the transmissions of other CIRNs via training, as discussed in more detail below. After training, the CIRN nodes may minimize their interference in other CIRNs based on the information obtained using another machine-learning algorithm. Further, the CIRN nodes may discover and determine the topology of other CIRN networks using another machine-learning algorithm. The machine-learning algorithms may be stored, for example, in a memory of a CIRN node.

One method of CIRN collaboration is for the CIRN to aid transmissions between sources and destinations in a neighboring network (also referred to as a collaborating CIRN) sharing the same spectrum by relaying the packets. This is unlike existing systems, which act in isolation and treat transmissions from other networks as interference and thereby try to avoid the transmissions or treat them as noise. Moreover, existing systems may be unable to relay packets from an entirely different network or even make a determination of whether or not to relay due to the different nature of the network. Relaying has typically been considered only within the same network, where the encoding schemes are explicitly known and the nodes coordinate. For inter-network relaying, it is desirable for identification of both the source and destination to be undertaken with minimal overhead, and even in cases in which the encoding schemes are not explicitly known a priori. As the physical layer techniques (e.g., the radio access technologies (RATs)) used by the source in the other network may be only partially known or completely unknown to the relaying node in the CIRN, adding an additional layer of complexity to the ability to relay the packets through the CIRN.

Nevertheless, a machine-learning algorithm may be used in cooperation with the increased computational power available at the CIRN nodes to permit the CIRN to collaborate with the neighboring network and improve the overall spectral efficiency by aiding transmissions within both the CIRN and the neighboring network rather than treating transmission from the neighboring network as interference. This may reduce contention in the spectrum and promote efficient utilization of radio resources.

The techniques and methods described below enable explicit relaying of data between source and destination pairs belonging to a different network and enable the CIRN to determine the topology of other CIRNs as well as the roles of different CIRN nodes in the other CIRNs. Architecture designs are described under different aspects, including blind and non-blind conditions for the CIRN nodes to autonomously team through collaboration and training on how to avoid interference, how to identify the source/destination pairs in the collaborating network, which relaying scheme to use under the different aspects and scheduling and prioritization mechanisms.

In non-blind conditions, an explicit collaboration channel may exist between the nodes. The collaboration channel may be a specific frequency or set of frequencies reserved (at least at specific time periods) to provide the information indicated herein (e.g., ID information, relay identification, reward information). The techniques and methods described below may be designed to minimize the load on the collaboration channel.

Figure 7:
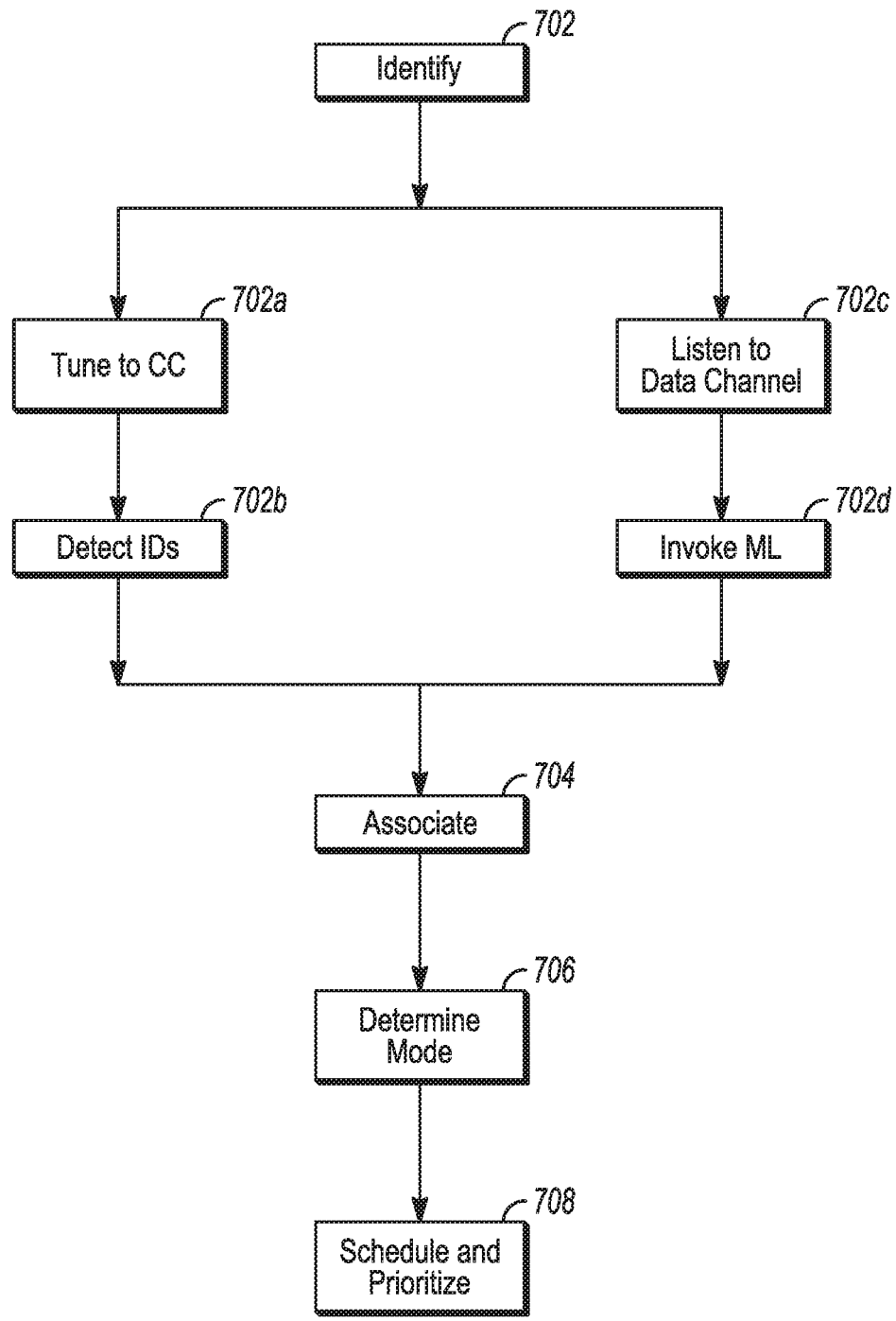
FIG. 7 illustrates a method of relaying according to some aspects.

The CIRN may be able to aid the transmissions of another network through relying the packets of the transmission if the CIRN is in the transmit/receive (Tx/Rx) range of the source and destination nodes (and thus the packets from the source and destination nodes are able to be received by the CIRN nodes), FIG. 7 illustrates a method of relaying according to some aspects. The method may be performed by one or more of the devices described in relation to FIGS. 1-6. The nodes of the CIRN may undertake one or more of the operations described in FIG. 7. As in the various embodiments described herein, one or more of the CIRN nodes may use processing circuitry to undertake the machine-learning, modeling, and resulting actions and a memory to store various network and node information as well as the machine-learning algorithm(s and model(s).

In operation 702, the CIRN node may identify whether the CIRN node is in the Tx range of a source node and Rx range of a destination node, and thus determine whether the CIRN node is able to be a relay node. The source and destination nodes may be in a different network from the CIRN node.

The CIRN node may use either or both explicit and implicit means to determine whether the CIRN node is in communication range of both the source and destination nodes. The explicit method may make use of the collaboration channel. In particular, at operation 702*a* the CIRN node may tune to the collaboration channel during a time window, which may repeat after a predetermined amount of time. Each node in other networks may broadcast an ID on the collaboration channel. In some aspects, each node may thus tune to the collaboration channel to broadcast the ID at the appropriate time. The broadcast may be based on a timing-based model in which assigning an individual time within the time window for each node based on, for example ID of the node. The times for the nodes may be updated periodically to provide for timing overlap for nodes determined to be sufficiently distant from each other such that their transmissions would be unable to be determined by the CIRN node. In another aspect, rather than the transmission time being assigned, contention-based transmission may be used in which a node may transmit the ID only a predetermined number of times, such as a single time. Alternatively, one or more central coordinator nodes of the network in which the source and/or destination node reside may coordinate transmission of multiple IDs and their locations (e.g., GPS or relative to a predetermined location).

In another aspect, every CIRN node may continually listen to all channels. Based on what each node decodes, the node can try to determine the source/destination pairs. In another aspect, traffic in the neighboring network may be used to trigger the relay functionality in the CIRN node. In such an aspect, the CIRN node may decode signaling on the collaboration and/or one or more data channels when the traffic in the neighboring node is determined to be high. The amount of traffic may be either indicated to the CIRN node through a message in the collaboration channel or based on implicit determination of the traffic by the CIRN node as measured intermittently. For example, the CIRN node may determine that traffic in the neighboring network is high after a determination that there are a significant number of retransmissions occurring on the channel. This may be based on the below discussed machine learning techniques. In this case, the CIRN node may be triggered to further to identify the source/destination pairs to determine whether the CIRN node can help in relaying data between the source/destination pairs and reduce the retransmission traffic.

After tuning to the collaboration channel during the time window at operation 702a, the CIRN node may detect the IDs at operation 702h. In some aspects, the Ins may be transmitted using a predetermined format specifically for ID transmission. This format may be decoded by the CIRN node. After detection of the IDs, the CIRN node may tune back to the original channels) used for transmission in the CIRN.

Thus, in some aspects, messages on the collaboration channel may have a predetermined protocol that is used by all nodes that communicate on the channel. For example, the protocol may be based on a LTE or NG protocol, in which where the timing are synchronized, or may be unsynchronized, such as an IEEE 802.11 based CSMA type MAC and pre-determined PHY layer codings. The packet structure may also be predetermined with different fields specifying information corresponding to the field in a manner similar to the 3GPP or IEEE (among others) standard.

On the other hand, if the collaboration channel is unavailable or does not exist, the implicit method may be used. One example in which use of the implicit method may be preferred over the explicit method (even though the collaboration channel is present) may be in cases in which use the explicit method incurs a large overhead in signaling. Such a case may occur, for example, when the traffic load is high in the network. In this case, a CIRN node may at operation 702c listen to the data channel used by the source and destination node.

In some cases, the CIRN node may overhear transmissions of the source and destination nodes on the data channel and identify the source and destination pairs from the overheard transmissions. In particular, each packet transmission destined to a particular destination node may have one or more headers that identify the destination node. In some cases, however, the headers may not be immediately decodable by the CIRN nodes due to differences between the physical layer mechanisms used by the CIRN and those used by the other network. In this case, the pattern used in the headers may be learned by the CIRN node through the use of a machine-learning classification model at operation 702d, circumventing a direct extraction of an ID of the source and destination nodes. The machine-learning classification model may allow the CIRN node to predict that the overheard packets belong to a particular destination.

Independent of whether the IDs are detected at operation 702b via the extrinsic method or the packets are overheard and the machine-learning classification model engaged at operation 702d, the CIRN node may associate the source and destination nodes at operation 704. Thus, for the extrinsic method, when the collaboration channel has characteristics similar to a data channel, any CIRN node that hears transmissions from both the source node and the destination node may be able to act as a relay node for transmissions between the source node and the destination node in the other network.

On the other hand, when the intrinsic method is used by the CIRN node, the machine-learning classification model may use source information in the packets to determine the link between the source and destination nodes. One manner in which the machine-learning classification model may determine the association between the source and destination nodes is to use network actions. In particular, the destination node may transmit acknowledgements (ACKs) and negative acknowledgements (NACKs) in response to reception of packets from the source node. In addition to the original data packet, the CIRN node may overhear the response from the destination node. By jointly processing the transmitted packets, the ACKs/NACKs along with the timing information between the packets, a machine-learning algorithm may be able to jointly identify the source-destination pairs and the packets.

Figure 8:
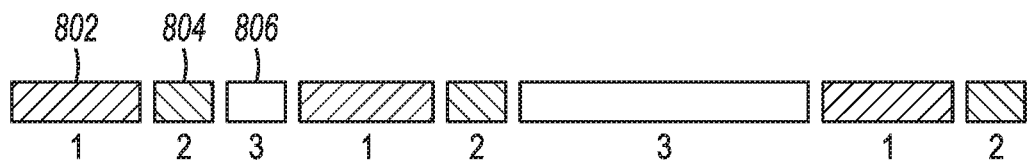
FIG. 8 illustrates source-destination pair transmissions according to some aspects.

FIG. 8 illustrates source-destination pair transmissions according to some aspects. The packets include packets transmitted by the source node 802, ACK/NACKs 804 from the destination node in response to the source node packet 802, and other transmissions 806 in the network that contains the source and destination nodes. The other transmissions 806 are unrelated to transmissions between the source and destination nodes. The CIRN node (potential relay node) that overhears all of the packets may apply a classifier to each of the packets. A clustering algorithm may use the classifier to categorize the packets into the different classes; for example, the clustering algorithm used on the headers/preamble may classify all the packets (labeled 1) into one category. In addition, the relay node may also identify that whenever the packets labeled 1 are transmitted, packets (labeled 2) are also transmitted. The machine-learning algorithm may determine the pairing of these packets based on timing between the associated pairs. Thus, by identifying the timing, the CIRN node can identify the source and destination pairs.

The classification problem to be determined by the machine-learning algorithm is as follows: for every pair of packets, identify either the corresponding source-destination pairs or determine that no such pairs exist. It is possible that a pair of packets may not correspond to a valid data packet-ACK packet pair, in which case the combination is an invalid pair. The number of combinations of packets can be significantly large if there are multiple source-destination pairs in the communication range of the CIRN node. To avoid this, a three-stage classification procedure, given below, may be used to reduce the complexity of the classification problem.

Figure 9:
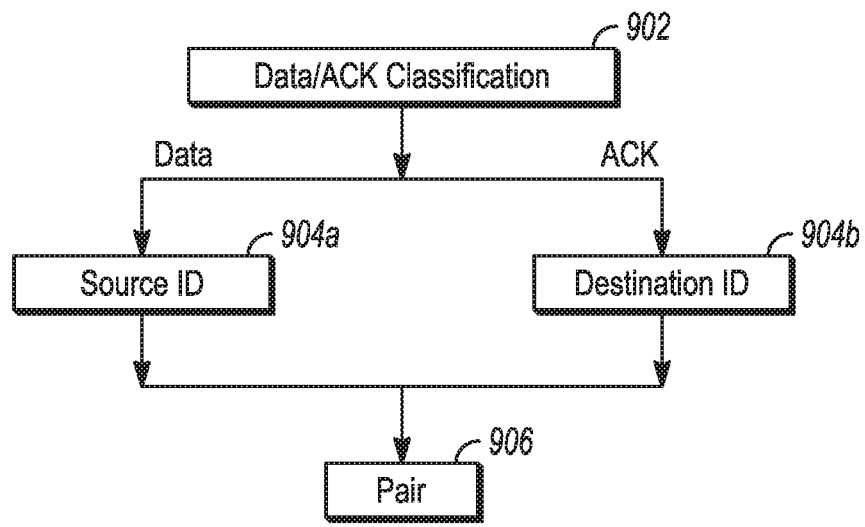
FIG. 9 illustrates packet classification according to some aspects.

FIG. 9 illustrates packet classification according to some aspects. As shown in FIG. 9, at operation 902 the packet features of each packet overheard by the CIRN node are used to determine whether the packet is a data packet or an ACK/NACK packet. If the packet is classified as a data packet, at operation 904*a*, the source ID of the data packet is determined, e.g., by extraction from the packet header or packet features (e.g., length). Similarly, if the packet is classified as an ACK/NACK packet, at operation 904*b*, the destination ID of the data packet may be determined, e.g., by extraction from the packet header or packet features.

After determining the source and destination nodes, at operation 906, the destination ID for a particular packet may be identified for a given data packet. The ACKs/NACKs, length, and/or different transforms of the PHY layer signal (Wavelet, FFT etc.) may be used at this point to train the classifier. For example, the correlation between the data packet header from a particular source ID and ACK header corresponding to those packets can be used by the algorithm to determine the destination ID for the data packet.

Note that the training may be carried out in real time or may be carried out offline through extensive simulation of different protocols and networks. Further, the training may be further adapted in an online manner using feedback of what is observed. For example, when a CIRN node uses a particular power level or relaying scheme and the CIRN node observes that the data rate ACK/NACK ratio has changed in the neighboring network, then the CIRN node may determine that the input vector and the output are consistent or inconsistent and hence can be accordingly adapted.

The classification may accordingly be treated as a two-stage problem in which, in the first stage a classical data association is performed where the data packets are associated with corresponding ACK packets. Techniques such as Joint Probabilistic Data Association (JPDAF) may be used to make this determination. Alternatively, the classification algorithm may also frame this as a clustering problem, in which data/ACK pairs are clustered according to their source/destination pairs. In the second stage, the data packets could be classified into destination IDs.

In addition to the CIRN node identifying and associating the source and destination nodes actions however, the source and destination nodes also make determinations. In particular, both the source and destination nodes may identify the existence of a relay node (the CIRN node) that can aid in the transmissions. This may occur, for example, through explicit information (using the collaboration channel) in which messages transmitted by the CIRN node may have one or more fields that indicate whether the CERN node is going to act as a relay for a particular source/destination pair. In some aspects, a flag may be set in a relay field of the message transmitted by the CIRN node, with the relay field followed by the source and destination ID. Alternatively, the source and destination nodes may use implicit information through blind signal processing techniques. The source and destination nodes may accordingly modify the transmissions and well as the decoding to optimize the performance for efficient coding as well as decoding of the received packet based on access to the relay node. After identifying the existence of a relay node, the source and destination nodes may then actually identify the relay mode through one or both of two mechanisms: explicit or blind identification.

Using explicit identification, the relay node, after identification of the source/destination pairs, may transmit a message in the collaboration channel. The message may indicate that the CIRN node is able to act as a relay for the collaborating CERN in which the source and destination nodes reside. As above, the relay node may transmit the message during another predetermined time window in which the source and destination pairs are configured to listen. In other embodiments, the relay node may instead transmit essentially simultaneously with the source; as both transmissions contain the same data, the receiver may coherently combine the transmissions e.g., when amplify-and-forward is used). The relay node may transmit a message indicating all pairs that have been associated by the relay node or may transmit separate messages for each pair.

After the transmittal of the association message, the source/destination nodes and the relay node may communicate via an initial handshake in the collaboration channel. The handshake may be similar to handshakes between the source and destination nodes, i.e., establishing the protocols of the communication link between the source/destination nodes and the relay node before initiation of the relaying. After the handshake, the relay node may be able to relay transmissions between the source and destination node.

In some cases, however, to minimize collaboration channel resources, the collaboration channel may not be burdened with handshake transmissions. In such aspects, blind identification may be used by the relay node rather than an explicit identification of the relay. The relay node may merely overhear packets that are transmitted by the source and, having already associated the source and destination nodes, relay the overheard source packets. In this case, the destination and source node may overhear the transmissions from the relay node. In some cases, the source node may be a full duplex radio, in which case, may be able to identify that the collaborating CIRN is relaying packets from the source node. The source node may therefore utilize a known physical layer coding technique for a relay channel. The destination node may be able to obtain the coding technique from the source node as part of the packet. Alternatively, the destination node may use blind techniques like independent component analysis (ICA), Principal Component Analysis (PCA) or Neural Network (NN) to identify that the transmission is a Multiple-input and single-output (MISO) and not Single-input and single-output (SISO); that is the destination node may use the above or other source separation techniques to separate the two sources (the direct transmission and the relayed transmission) to determine that a relay CIRN node is being used. This may involve the use of multiple antennas on the destination node. Note that the source, if a full-duplex radio, can listen to transmissions of other nodes in the wireless medium when simultaneously transmitting its own information and determine whether the other transmissions in the air are correlated with its own data.

Turning back to the relay method of FIG. 7, after association by the relay node and the source and destination nodes at operation 704, the optimal retransmission mechanism (relay mode) may be determined at operation 706. The relay mode may include a relay operation anode in Which the CIRN node relays a received signal from the source node and a non-relay mode in which the CIRN node does not relay a received signal from the source node. The relay operation mode may be an amplify-and-forward mode or a decode-and-forward mode.

In the amplify-and-forward mode, the relay node may simply amplify and retransmit the received signal from the source node without decoding the signal. As the signal is not decoded, for amplification the relay node may not know the modulation and coding scheme used by the source node; the overhead on the relay node may be minimized. The retransmission power of the relay node may be optimized at the relay node to minimize interference and maximize the relay gains. For example, too high a transmit power by the relay node may adversely affect other nodes by causing increased interference, thereby offsetting the benefit to the destination node. To avoid this, the relay node may monitor the ACKs and NACKs and the transmit power may be adjusted accordingly. For example, the transmission power of the relay node may be incrementally increased if the source/destination pair have a high number of NACKs until a predetermined acceptable balance between ACKs and NACKs is overheard or otherwise obtained by the relay node. Likewise, if the relay node determines that excessive interference is being caused by transmissions of the relay node (see in more detail below), the transmission power of the relay node may be incrementally decreased. In some aspects, the machine-learning algorithm may be trained based on the above actions and rewards of increasing/decreasing the transmission power for the particular source/destination pair.

In some aspects, a neural network may be trained to establish the retransmission power. This neural network may, for example, take as an input the number of ACKs and NACKs after retransmission and outputs the transmit power of the retransmission. Other inputs of the neural network may include the packet signature, which may inherently encode the coding schemes, the rate etc, which can also determine the Tx power. The retransmission power may also be posed as a reinforcement learning problem in which the action space is the transmit power and the reward space is the throughput or a proxy to the throughput. Such a proxy may include the number of NACKs and/or the number of collisions in the system.

In the decode-and-forward mode, the relay node may demodulate and re-modulate the transmission from the source node and subsequently transmit the re-modulated signal to the destination node. In this case, the relay node may first identify the modulation being used for the data packet. The modulation information may be explicitly sent by the source node to the relay node through the collaboration channel. Alternatively, the relay node may use a machine-learning classifier to identify the modulation order of the data packet. Existing techniques based on neural networks may be used for this purpose.

In addition to the modulation order, the relay node may be able to decode the packets through knowledge of the coding scheme and re-encode and transmit the packets. In this case, the coding scheme used by the source node may be determined in a manner similar to the above i.e., either explicitly exchanged or determined using a machine-learning classifier.

After determining the retransmission mode at operation 706, the relay node may prioritize packets received and schedule retransmission of the packets at operation 708. Scheduling and prioritization may be similar to that used for multiple technologies such as cellular networks, wireless sensor networks and wireless LANs, among others, from the perspective that all the nodes belong to the same network. In these networks, different types of schedulers may be used. The schedulers may be used to one or more of: avoid interference implement listen-before-talk), take into account the different link capacities (be capacity-aware), maximize throughput in the time and/or frequency domains (dependent on the CIRN or neighboring network), or optimize rate selection in heterogeneous networks environments, among many others that take into account quality of service of the transmissions, traffic load of the different networks, etc. However, scheduling used previously by a node has not taken into account both its own network and neighbor network data to maximize performance of the node while helping a neighboring network to have connectivity by relaying data from an isolated node. This may be due, at least in part, to the lack of incentives from the neighboring network to compensate for the energy a node in the network uses in relaying packets from and to the neighboring network.

Each team can have one or more relay nodes that can perform forwarding of messages from a neighbor team in addition to actively participating in communications within its own team. A team may be a group of nodes that have traffic to be exchanged only amongst nodes in that team. Further, each node in a team may use the same protocols and PHY mechanisms that is known to all members in that team. In such a scenario, one goal of the scheduling is to determine whether to operate a node as a regular communication node or as a relaying node for other teams, and allocate resources accordingly, without compromising network performance within its own network.

If the scheduling decision is to relay, the node may operate in different relaying modes depending on its capabilities. Hence, at each time interval m, the goal of the scheduler is to determine whether the node is to relay the transmission or which relaying mode to operate so as to maximize a collaboration score dependent on the characteristics of both the CHUN and the neighboring network. Some of the modes of operation include the relay node acting as a) regular node (i.e., not relaying other teams' messages), b) amplify-and-forward relay node, and c) decode-and-forward relay node.

The collaboration score may be maintained at the node, for example, or by a network manager who may can globally allocate specific rewards to collaborating teams. Alternatively, the collaboration score may also be maintained in a distributive manner by each of the other teams. For example, a team that was helped could stay silent for a certain period of time when the collaborating team has packets to send.

To make the scheduling determination, a relaying node may have multiple supporting feedback mechanisms, including decisions based on performance and/or collaboration. For the former, each team may be able to measure performance of the team. The performance measure can be selected depending on the purpose of the network. For example, throughput may be used as the performance measure in some networks. In other networks, however, if the network usage is delay sensitive, a latency-related measure can be used rather than throughput. Additionally, a combination of measures (e.g., latency and throughput) may be used to balanced priorities. This metric may be used to evaluate all teams/network performance.

In addition to or instead of the performance measurement feedback, collaboration feedback may be used. After each transmission interval, each team can exchange performance data with each other using the collaboration channel. The performance exchange may occur, as above, at predetermined time periods and either be scheduled or contention-based. This performance may measure the quality of communication. The performance measurement may, for example, represent the observed throughput by each team or any other observable performance indicator(s) that can allow each team to calculate its performance metric(s).

As noted above, a given collaborating node in a CIRN can be a relay for multiple source-destination pairs: some that are part of its own CIRN and other part of different neighboring CIRNs. Prioritization for scheduling may be based on reward maximization among the CIRNs. The reward maximization, as above, may either be explicit or implicit.

An explicit reward-based mechanism may be based on advertisement in the collaboration channel. In particular, the relay node may advertise in the collaboration channel that the relay node is willing to relay packets for the neighboring CIRN that provides the best "price". For example, the price may be the number of time slots the neighboring CIRN is willing to remain silent and free up resources for the relay CIRN. In another example, the price could also be reduction in transmit power that minimizes interference in the network of the relay node. In another example, the neighboring CIRN could offer to relay any packets for the collaborating CIRN. One method could be to choose the source/destination pairs from the CIRN that offers the best price.

In a different aspect, a reinforcement learning algorithm may be developed in which the state space is the CIRNs for whom the relay node is able to act as a relay. One example to quantify the reward is to look at the long-term performance as identified earlier for each CIRN and determine the policy accordingly. The reinforcement learning algorithm may select the CIRN for which the relay node is to relay such that the long-term expected reward is maximized. Long-term may be, for example, at least several superframes or several minutes or hours. Long-term may depend on how long the (fixed or mobile) networks are active. If mobile, for example, long-term may be the duration until which the network is expected to interact with the same set of other teams.

The implicit reward mechanism may be based, as above, on monitoring by the relay node. Specifically, the relay node may monitor the overall throughput improvement in the network due to relaying for a particular source/destination pair. The action space may be the space of all possible scheduling/prioritization choices. The reward may be, as above for example, the network throughput. Since the true network throughput may not be available to the particular relay node, a proxy for the network throughput may be developed and used. For example, the proxy may be a weighted sum of the throughput of the CIRN of the relay node along with the number of successful transmissions the relay node overhears. The number of successful transmissions may be based on observed ACKs, NACKs and retransmissions as observed by the relay node.

In one example of a scheduling algorithm for implicit reward mechanism, x is a relaying node in a network N, and O is a neighboring network of N. At interval m, node x decides whether or not to relay a message for O. The collaboration score of a team T that includes the relaying node is composed of the measured performance (e.g., throughput or the other measures above) of T and the measured performance of neighboring teams, penalized by the use of disallowed frequencies (frequencies outside allowed frequencies for a given scenario) by the team or neighboring teams. For example, PSD measurements may be taken to determine the collaboration score. During regular node operations, the collaboration score may be given by the performance of N, whereas relaying modes may be measured by the performance of both N and O. In both cases, the performance may be affected by whether the communications were successful or not. Note that different weights for scoring may be given to successful delivery of different traffic classes (e.g., VoIP=7.5, leaky bucket=1, FTP=1, HTTP=2.5), as well as for different priorities of traffic flow.

A decision theoretic approach may be used to determine the best mode to operate at interval m. Let r* be the optimal relaying mode for node x at interval m, the node decides the operation mode based on the following objective function:

$$r^* = \operatorname{argmax}_{r \in R} \mathbb{E}[\text{Utility}(r)]$$

$$r^* = \operatorname{argmax}_{r \in R}[P(s,r) \times \text{Utility}(r,s) + P(\neg,s,r) \times \text{Utility}(r, \neg s)] \quad (1)$$

Where R=(noRelay, amplify, decode) is the set of relaying modes supported by x, P(s,r) is the probability of the transmission being successful using relaying more r, and Utility(·) is the utility function that measures the benefit of the relaying action r. This utility function can be model as the collaboration score, for example:

$$r^* = \operatorname{argmax}_{r \in R} \mathbb{E}[\rho \times (\text{Perf}(N,r) + \text{Perf}(O,r))] \quad (2)$$

The algorithm of relay mode selections may then be as follows:

```
Algorithm 1 Scheduling (m, relay modes R, N, O, m):
1.  Input:
2.  N: Team network
3   O: Team neighbors
4.  m: interval
5.  r: {noRelay, amplify, decode}
6.  While True:
7.      P_N = Performance(m, N)
8.      P_O = Performance(m, O)
9.      r* = argmax_{r∈R} [P̂(s, r) × Utility(r, s, P_N, P_O) + P̂(¬s, r) × Utility(r, ¬s, P_N, P_O)]
10.     Schedule mode r*
11.     P̂ ← UpdateSuccessModel(P_N, P_O)
12. End While
```

At every interval m, the scheduling algorithm may measure the performance of its network (line 7) and update the measured performance of other networks (line 8). The algorithm may use Equation 2 to determine the best relaying method (line 10). At the end of each round the scheduler may update the model of success P.

Another method is for each CIRN to semi-statically configure the proportion of time-frequency-resources to be used for opportunistic relaying. This allocation can be assessed based on longer term assessment of performance. Alternately, the proportion may be incremented or decremented dynamically (in an outer-loop adaptation manner), based on positive/negative trends in measured performance of the Team/Neighbor Network. The algorithm may also be adapted based on changes in demand and requirements on the team network. This demand may be assessed by applying machine-learning approaches to predict short term demand through prediction of the traffic statistics within the network. Potentially the loading on the neighbor networks may also be assessed through monitoring, classifying and predicting traffic statistics of the neighboring nodes via machine-learning based predictive approaches. In some aspects, the CIRN node may limit relaying of the packets to those packets having particular features, e.g., the CIRN node may forward multi-carrier OFDM transmissions only.

Figure 10:
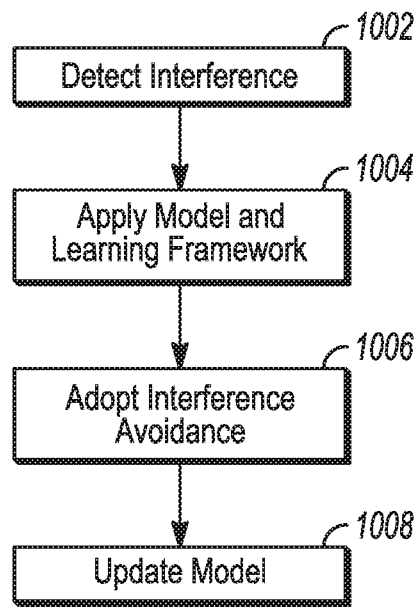
FIG. 10 illustrates a method of avoiding interference according to some aspects.

The above focuses on machine-learning solution to determine whether or not to relay communications of an entirely different CIRN. Further, the CIRN node may make a determination of whether or not the communications of the CIRN node are affecting the neighboring CIRN. FIG. 10 illustrates a method of avoiding interference according to some aspects. The method of FIG. 10 may be performed by one or more of the devices described in relation to FIGS.

As above, the other networks may share the spectrum used by the CIRN node. Each CIRN node may detect that interference has been caused to neighbor nodes/networks. The CIRN node may further identify features that can help inform later actions that can be defined to mitigate that interference. The interference estimation methods may take one or more of several possible approaches, ranging from explicitly signaled information about the interference to methods for detecting and estimating the interference based upon varying amounts of side information. The latter methods can be broadly divided into model-based approaches, which rely on algorithm features extracted from raw I/Q signals, and deep learning-based approaches, which use supervised learning to train neural networks to perform signal classification tasks. The learning-based approaches may, for example, use interference detection to improve a collaborative score that is a measure of success of coexisting of the CIRN node with other networks in the same spectrum. The method shown in FIG. 10 may use end-to-end deep reinforcement learning of the interference environment and avoidance strategies to determine an optimal course of action.

As shown in FIG. 10, at operation 1002, each CIRN node may detect interference caused to neighbor nodes and/or networks by transmissions from the CIRN node. One or more interference estimation methods may be used, including blind and non-blind estimation.

Blind estimation may use an underlying feature/energy discovery/detection approach from a spectrum sensing unit to identify traffic of a neighbor that overlaps with the transmission of the CIRN node. One or more techniques can be utilized to estimate the interference. For example, the CIRN node may detect a particular modulation or signal feature from a node or network at a time overlapping the transmission of the CIRN node. After detection, the CIRN node may detect a different modulation (e.g., a lower modulation order) or different feature from the same node or network. This behavior may indicate that the transmission from the CIRN node is likely causing retransmissions by the neighbor node or network. The detection of the transmissions from other nodes can be performed by one or more nodes in the agent's group. Detection schemes can use a cyclo-stationary method (in which a signal is transmitted whose statistical properties vary cyclically with time and the response determined as a function of time) or energy detection methods. As mentioned above, in some traffic scenarios the node transmissions may be highly repetitive (e.g. VOIP, MPEG-DASH video streaming, etc.), which can provide the opportunities for various nodes to perform measurement/detection in between successive transmissions.

In some aspects, overall network traffic may increase above a predetermined threshold when the CIRN node transmits. The CIRN node may estimate the average traffic before starting to transmit. Alternatively, the CIRN node may maintain a running average of the traffic and observe the manner in which the averages changes after transmission starts. Interference may be estimated at the CIRN node using a covariance matrix. In particular, a time-averaged correlation matrix $E[y \cdot y^*]$ may be calculated where y is the received signal and E is the time-averaged function.

Non-blind estimation may use a-priori knowledge stored in the CIRN node. Alternatively, or in addition, non-blind estimation may be based on information provided to the CIRN node via the collaboration channel. A-priori knowledge assumes that the CIRN node is able to differentiate between the original transmission and a re-transmission from another node. This may mean that the CIRN node is able to decode a packet from the other node. In some aspects, if the CIRN node is unable to decode a packet (contrary to the above), the CIRN node may avoid relaying the packet, e.g., the CIRN node may forward only multi-carrier OFDM transmissions.

The CIRN node and the nodes in the other network may share their own transmission information via the collaboration channel at predetermined intervals. In some aspects, the nodes may send a control packet in the collaboration channel to signal their active frequency channels. In this case, a bit may be associated with each channel and may be set to one when the node is active. Other nodes may monitor the information in the collaboration channel packets to measure the activity in each channel.

Other information that may be shared includes the traffic pattern of the transmission. The traffic pattern may include the periodicity and duration of the transmission. For example, VOIP traffic contains voice data frames where the source encoding may represent 20 ms voice frames (ignoring silence suppression etc.). As another example, traffic to/from nodes that are streaming video based upon MPEG-DASH protocols typically contains downlink traffic which may be 2s (or some other fixed duration in time) segments of MPEG encoded video and uplink traffic of very short HTTP request packets sent once per HTTP segment.

Alternatively, or in addition, the physical layer transmission parameters, such as the modulation scheme and other signal information that can act as signature for each node transmission, may be shared by the node in the collaboration channel. The receiver (e.g., CIRN node) can therefore effectively associate each signal type received with a particular node and ultimately estimate the interference caused to that node.

Other nodes may receive the above information over the collaboration channel and can estimate the expected overlap of their own transmission with the neighbor. This also allows preemptive transmission approaches to avoid interference to the neighbor agents.

Alternatively, or in addition, interference information may be shared by the neighboring network node in the collaboration channel. In this case, each node may use the collaboration channel to report the interference levels detected by the node. As above, predetermined times may be used to transmit the interference levels, along with the ID of the node transmitting the information, By observing the interference levels reported at different times, the CIRN node can correlate and determine the relationship of its own transmission with the interference at other nodes in the neighbor network. Hence, each CIRN node may be able to determine an interference graph containing itself and the edges (in terms of physical distance or other nodes) to which the CIRN node is likely to cause interference.

In some cases, it may be desirable to minimize the amount of overhead on the collaboration channel to prevent overuse of the collaboration channel. One way to minimize the overhead due to the amount of information exchanged on the collaboration channel is to restrict nodes to transmit only the interference information corresponding to a delay-sensitive transmission, such as a Voice-over-IP transmission. Alternatively, upon each re-transmission or after a predetermined number of re-transmissions, the node may set a congestion flag to warn all other active nodes in the network.

In order to correctly associate the interference report with a particular node, each node can tag the information on the collaboration channel with an identifier that uniquely identifies the node. As above, the node that provides the interference report on the collaboration channel may be within the CIRN network of the node receiving the interference report or may be in a different network.

The collaboration channel can also be utilized by a node to alert other nodes about an impending transmission of interference-sensitive traffic that has stringent delay and/or other QoS requirements. Upon receiving the alert message, each node listening to the collaboration channel can use the interference avoidance methods indicated herein and improve the collaboration score.

The nodes may in addition or instead of information on the collaboration channel use a-priori knowledge. As above, the use of a-priori knowledge may assume that the nodes can differentiate between their own and another node's original transmission and retransmission. The ability to fully decode the packets means that the nodes may be able to directly infer the interference impact by identifying the affected transmissions of other nodes.

For each of method above, the CIRN node can estimate the interference caused to other nodes or networks in a passive mode or a proactive mode. In the proactive mode, the CIRN node may send explicit transmissions (e.g., probes). The interference probe may be transmitted on all bands in a predetermined sequence, such as round robin probing on all bands of operation. The frequency of transmitting the probes can be determined by the traffic in the system, the reduction in throughput faced by the CIRN node. The CIRN node may then observe the interference in a particular network and/or the number of retransmissions in the particular network. For example, the CIRN node may observe the energy per band to observe in which bands a sudden increase in received signal energy follow a probe transmission. This may permit the CIRN node to maintain a per-band database of the interference caused by the CIRN node to other nodes. The CIRN node may monitor different frequency bands to identify the potential interference before transmission. In addition, if the CIRN node is a MIMO node, the CIRN node may monitor different frequency channels in different directions for interference.

In the passive mode, the CIRN node does not send an explicit transmission. The CIRN node may instead use any of the methods indicated above to estimate the interference caused to the neighbor nodes.

A complementary method to infer interference in the network may be to have silent periods in which the CIRN node does not transmit. The CIRN node may simply observe the interference in the neighboring network. This may allow the CIRN node to not only determine the interference that the CIRN node causes to other nodes such as immediate neighbors (i.e., within transmission/reception distance), but also in some cases the entire interference graph on the neighboring network. This latter performance may be achievable. For example, when the CIRN nodes exchange information between each other. This can also be done on a per spectrum band basis, allowing greater granularity of control to mitigate the interference.

At operation 1004, a learning-based model may be applied. In some aspects, the learning-based model may be a reinforcement learning-based reward computation method to learn from past actions of the nodes and network dynamics. The machine-learning algorithm may be designed to continuously learn from past actions with or without explicit information obtained in operation 1002. For example, when the collaboration channel information is not available to provide interference-related information, the CIRN node may use historical data to determine the probability that its own transmission is causing interference with the network.

To this end, the interference from self-to-neighbor may be modeled at each CIRN node using a finite set of states. The state model, which may be a Markov process, may be used by each of the CIRN nodes. Depending on the state-space representations possible and associated costs, different modeling can be utilized by the CIRN node. One such approach may be to have N independent 0-1 Markov process for each of the N nodes in the system with which the given CIRN node may interfere. For the nth Markov process, state 0 indicates no interference caused to node n and state 1 indicates interference caused to node n. The state transition probabilities ($\alpha$ and $\beta$) and the state probabilities may be initialized based on known data (e.g., through the blind or non-blind methods above). The steady-state probability distribution of the Markov models may be obtained from an offline model that has collected the raw transmission data and analyzed over time (e.g., at least several minutes to hours, if not days) to classify and determine the interference levels to each of the nodes in the past.

The knowledge of the interference levels to node n may be maintained using a belief state $B_n$ (taking values in [0,1]). The belief state $B_n$ may indicate the conditional probability that the CIRN node interferes with node n, given the decision and observation history. The observation history may be obtained in operation 1002 over the past several sensing attempts.

The CIRN node can perform different control actions (as indicated below) such as reducing power levels, adding or adjusting a silence period or a backoff period, etc. The backoff period may be set by a backoff timer that inhibits communications for the backoff period (in some cases, for contention of the channel). The set of control actions is a finite set in A. For each action, there may be an associated expected reward. The expected reward may depend on the belief states of each of the N nodes, i.e., a vector of probabilities indicating that the CIRN node is not causing interference to each of the N nodes given the historical action and observation history. Therefore, the action that maximizes the reward across all N nodes is the action that is performed by the CIRN node. In the reinforcement learning approach, the reward is typically accumulated over T time slots, with each slot corresponding to a discrete time step where an action is taken. In some circumstances, however, there may be greedy index-based policies for reinforcement learning that can aim to maximize the immediate reward (i.e., over a particular time slot as opposed to an accumulation). This may increase the difficulty in exploring some of the state spaces.

At the end of the action, methods used in operation 1002 can be utilized to also determine whether the CIRN node caused interference to other nodes. If new information is obtained, the belief states may be updated for the models. If no new information is utilized, the belief states may be updated based on the selected model. In some aspects, the model may use discrete time Markov model evolution. Thus, the belief states may accumulate new information from past actions and observations and can improve the detection accuracy and therefore aim to progressively improve the collaboration in the network.

In some aspects, the CIRN node may use a deep learning approach. In this approach, a neural network may be trained based on methods of operation 1002 to effectively determine the interference level caused to other nodes. Thus, the output of the neural network can be any of a set of decisions that help to characterize the interference caused. In some circumstances, a neural network can be trained in a controlled manner with different nodes turned on at different times and different modulations. This could be achieved within the network of the CIRN node itself. To train on the signals of the nodes belonging to other networks, either a supervised or unsupervised learning approach can be utilized.

The inputs to the neural network during training, whether supervised or unsupervised learning is used, may include one or both I-Q samples of the raw signals from each of the nodes in the network, as well as specific features extracted from a signal when a spectrum sensing module is supported by the node. These inputs can be labeled as the nodes know each other in the network. The network can schedule a controlled training phase when each node transmits a signal and all the other nodes receive, permitting supervised learning. The signal may be a predefined signal or a data transmission by the nodes. When the data cannot be labeled (as in the case of transmission by a node from a neighbor network), the CIRN network can utilize unsupervised learning and train the neural network based on the received I-Q samples in the air. The CIRN network can, however, control the transmitters within the CIRN network. The CIRN network may thus control the amount of interference during the training phase.

The outputs of the neural network can be any of the inferences indicated in operation 1002. In one aspect, the neural network can take the raw I-Q data received over the air and detect the modulation change in the air. Modulation changes occur when a node responds to detected interference or packet reception failure by employing a more robust modulation for the re-transmission or for future transmission of packets. The neural network may thereby decipher that the current transmission by the CIRN node is interfering with the neighbor node. By comparing changes in the neighbor node modulation type in the presence and absence of the CIRN transmissions, the CIRN node can decipher that the current transmission is interfering with the neighbor node.

Alternatively, the neural network can output the interference levels caused to each of the nodes in the neighbor network based on either the raw I-Q data received or the output of the spectrum sensing module. This output may include, for example, the modulation type or RSSI.

In another aspect, the neural network in the CIRN node can detect specific patterns in the neighbor nodes transmissions. The CIRN node may then output a decision regarding whether those transmissions are experiencing interference from the CIRN node.

A neural network can be trained to consider one or a combination of the signals mentioned above to determine the decision whether a neighbor node is experiencing interference. The neural network can be trained in a controlled manner with different nodes turned on at different times and different modulations. This could be achieved within the network of the CIRN node. To train on the signals of the nodes belonging to other networks, either a supervised or unsupervised learning approach can be utilized For supervised learning, online or offline training. In the former case, channel emulators can be utilized to generate different signal types representing other nodes in the network. The channel emulators may generate, for example, signals of different power levels, modulations, and traffic distribution, among others. The signals, as above, may be I-Q samples in the time domain. For such a network, a Recurrent Neural Network (RNN) can be a suitable candidate as the RNN can capture the time dependency. In the latter case, each node can use the information from spectrum sensing to label the received data in real-time and train a deep neural network in real-time. In this case, a significant amount of initial network transmission time may be utilized for training the network until the network can reliably classify signals and hence help in identifying the interference level from the CIRN node to the neighboring nodes.

For both supervised and unsupervised learning, the trained model can be downloaded on a local inference engine of the CIRN node or network. The local inference engine may be, for example, a Movidius neural-network processor. By downloading the model to the local inference engine, rapid inference and detection and classification of interference level caused by each CIRN node may be obtained.

After determining and training the model at operation 1004, the interference caused by the CIRN node to nodes in the neighboring network can be detected. Interference mitigation/avoidance methods can then be utilized by the CIRN node at operation 1006. For example, the model may reduce the transmission power, engage frequency hopping, and/or delay transmissions through the use of a backoff procedure, which may be analogous to the WiFi backoff procedure, to reduce the possibility of collisions.

Feedback from the result of engaging in the mitigation/avoidance methods may be undertaken at operation 1008 to update the belief states in the model used at operation 1004. The updating may be based on the action set and the associated rewards associated with each action, where the action is the interference avoidance methods utilized. Expected rewards can capture the impact of the transmission of the CIRN node on other nodes. The rewards can be defined using several functions of interference, retransmissions, and/or throughput. For example, the rewards may include reduced interference levels in the control channel notifications, a self throughput increase, and/or a reduction in the volume of retransmissions detected at operation 1002. Based on the action set and the reward associated with the action, the belief states can be updated on the fly to minimize the error in the actual reward compared to the expected reward.

Figure 11:
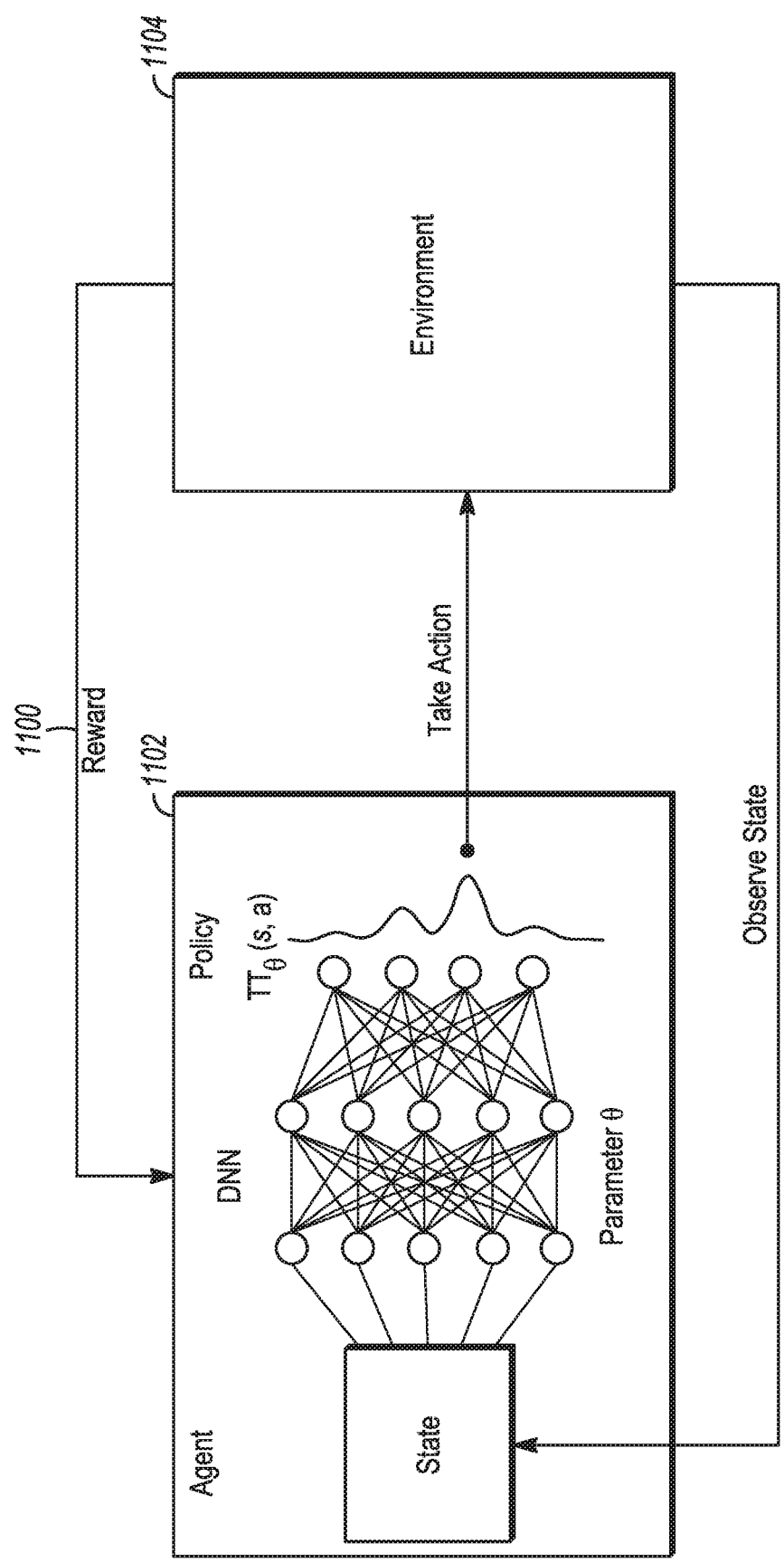
FIG. 11 illustrates a deep reinforcement learning framework according to some aspects.

FIG. 11 illustrates a deep reinforcement learning framework according to some aspects. The framework 1100 may contain a CIRN node (agent) 1102 that contains a neural network and an environment 1104 in which actions taken by the CIRN node 1102 produce effects, which include rewards and possible state changes. As opposed to decoupling the interference graph/map determination and the associated interference avoidance tasks, the CIRN node 1102 can be trained to learn the end-to-end task of observing the system state of the environment 1104 and perform actions autonomously while learning from the observed transitions in the system dynamics and past experience. To this end, the CIRN node 1102 observes (and records in memory) the system state the form of the input features or raw signals mentioned above.

The input state at any time t is given by $s_t$. The all or a subset of the following representations for the input states may be unrolled into a vector $s_t$: Modulation indices ($m_t$) of other nodes estimated using a spectrum sensing unit, interference reports ($I_t$) or estimates of $I_t$ from the other nodes, traffic levels ($L_t$) of the neighbor nodes, which may be either predicted or obtained over the control channel. A simple example of the traffic level estimation is the time-averaged correlation $L_t = E[y \cdot y^*]$ where y is the received signal and E is the time averaged function. In addition, the vector $s_t$ may include a PRY feature vector ($fp_t$), which includes the PHY features information and other unique signatures that are either estimated or obtained over a control channel report. The PHY features information includes features such as the bandwidth of operation, multiple access scheme such as OFDMA, FDMA or TDMA, maximum transmit power, length of preamble, and subcarrier spacing, among others. In addition, the vector $s_t$ may include a MAC level feature vector ($fm_t$), which may contain MAC feature information including backoff parameters, frame length, and duty cycle, among others.

For the given system $s_t$, the RL agent 1102 may perform an action $a_t$ with the overall system goal of minimizing or maximizing a performance objective. This may be the goal of the system under consideration. In a setup where nodes are allowed to collaboratively share the spectrum and co-exist with each other, fairness can be one of the key metrics. Fairness could be measured in many ways. For example, the overall spectral efficiency B of the system can be one goal of the agent 1102, i.e., $$B = \frac{1}{BW} * \sum_{i=0}^{N} Tp_i,$$

where BW is the bandwidth of the system. The overall spectral efficiency can be measured by each agent if the agents are allowed to periodically share their throughputs Tp with each other. If the throughput information is available but each agent wants to favor the throughput of its own above the other agents, a discount factor $\gamma$ can be applied to calculate the overall system goal such as $$Bp_i + \frac{1}{BW} * \sum_{j=1, j\neq i}^{N} \gamma_j Tp_j.$$

The system can also be a collaboration score that the agent 1102 obtains at the end of a transmission cycle from an arbitrator who monitors the performance of all the agents. The arbitrator may be located in a particular agent or may be a separate, network-based entity.

The action $a_t$ performed by the agent 1102 from a system state $s_t$ can be from a set of actions A which includes increase/decrease transmit power, select frequency channel for operation, backoff into silent periods/active transmit periods. The agent 1102 may select a combination of actions as well which makes the action space exponential over all possible actions. As above, instead of all actions, a subset of the above combinations can be presented as the set of actions for the agent 1102 to perform. In either case, after each action $a_t$, the state undergoes a change where the traffic and interference behavior in the network changes. As a result, the system may enter a different state $s_{t+1}$ while obtaining a certain reward $r_t$ for the action $a_t$ performed.

The reward function can be designed in order to guide the system towards maximizing the system goal. If $\mu_t$ is the instantaneous throughput of the agent 1102, then the agent 1102 can treat the reward as the sum total of the instantaneous throughputs of the agents. Alternatively, to guide the system towards a proportional fair performance, the reward function can be represented as $\Sigma_i \log \mu_{t,i}$ where a larger value indicates that all the agents are closer in their throughput performance. For any given state s, the goal of the agent 1102 may be to perform an action a based on a policy $\pi(s,a)$ that provides the probability distribution over the set of all actions for the state s given as:

$$\pi(s,a) = P(A_t = a | s_t = s)$$

The goal of the agent may be to maximize the expected accumulated cumulative discounted reward given as $$R_t = E\_\pi \left[ \sum_{k=0}^{\infty} \gamma^t r_t \right].$$

Figure 12:
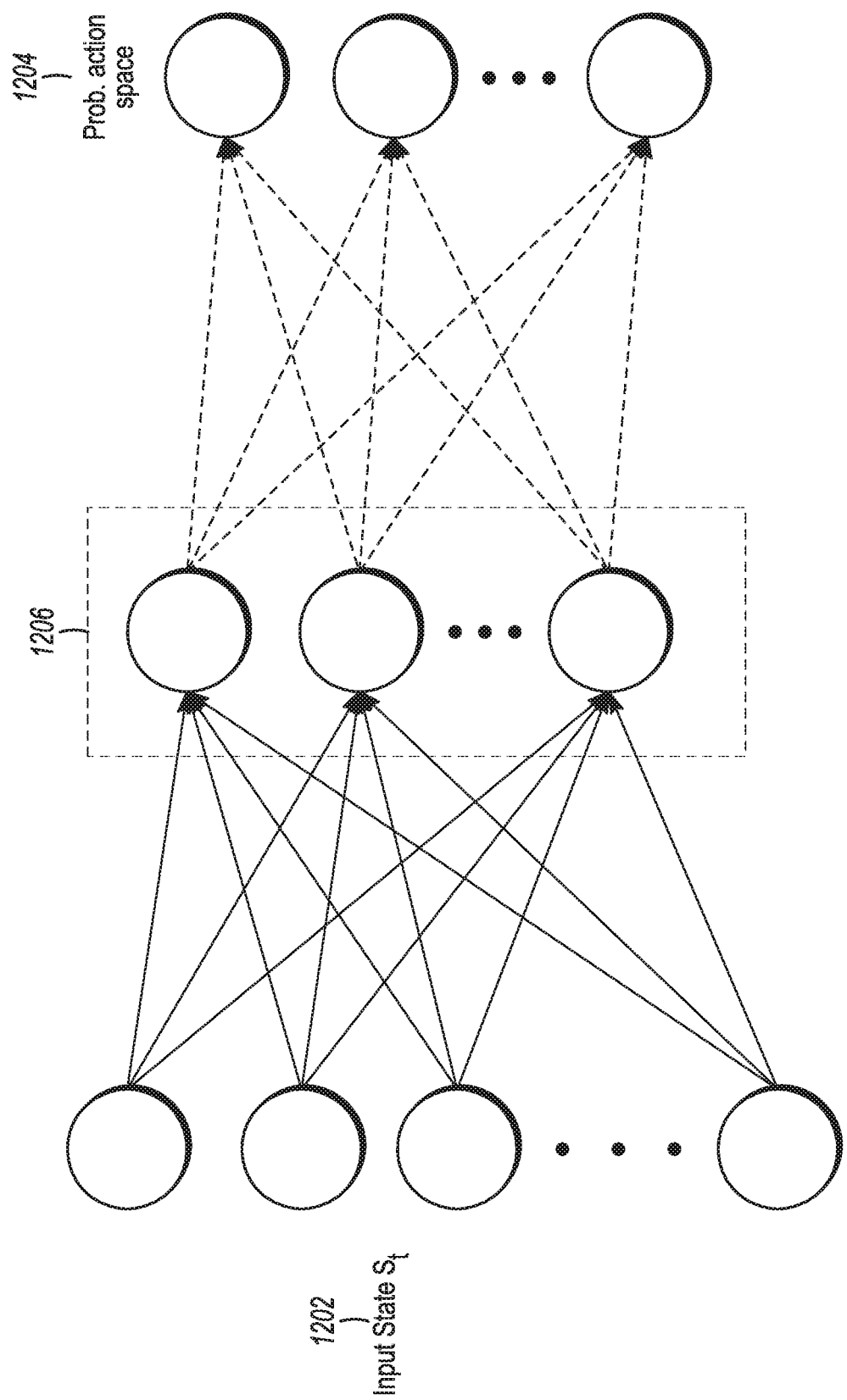
FIG. 12 illustrates a network mapping according to some aspects.

The policy $\pi(s, a)$ can be approximated using a deep neural network which is then indicated as $\pi_\theta(s,a)$ where $\theta$ is the parameter of the policy network. FIG. 12 illustrates a network mapping according to some aspects. Specifically, FIG. 12 illustrates policy network mapping state $s_t$ 1202 to probability over action space 1204.

The training algorithm may train via a training "game" in which multiple training rounds exist, with each training round of collaborative spectrum sharing period being where nodes transmit and the overall performance is studied at the end. The training algorithm may thus include multiple iterations in which, for each training iteration, and each episode/round of the training game different inputs and probability action spaces exist.

For each time step (iteration), the input may be the system state $s_t$ 1202 to the policy network of an N-layer DNN 1206, and the output of each time step may be the probability over the action space 1204. The weights $\theta$ of the DNN 1206 may be initialized to random weights. Different initialization of the policy weights can be utilized such as random initialization, Xavier initialization, etc.

For each time step, the agent may select an action $a_t$ based on the output of the DNN 1206 using the policy that the agent has initialized. The state, action and reward may be recorded in the memory of the agent for each time step and the cumulative discounted rewards at each time step calculated by a processor at the agent and stored in the memory. A policy update such as a policy gradient can be utilized to update the policy weights $\theta$. After a sufficient number of training iterations, the policy network parameters can be frozen and updated only when the environment changes sufficiently. This may be, for example, the number of agents change or the nature of traffic changes significantly, among others.

For each state-action pair, there may also be an associated action-value function. This may be known as the Q-function that is the expected reward starting from state $s_t$ 1202, taking action a, and then following policy $\pi$. The Q-function is given as:

$$Q_\pi(s,a) = E_\pi[R_t | S_t = s, A_t = a]$$

Maximizing the Q-function may permit use of an optimal policy that maximizes the expected accumulated discounted reward given the (s,a) at any given time. In other words, Q-learning may aim to find the optimal sequence of actions that maximize the long-term reward (whose time scale, as above, may be dependent on the type of network, among others).

To handle the exploding state-action space of the end-to-end learning problem, a DNN may be used to approximate the Q-function in the form of a Deep Q-Network (DQN) $Q_\pi(s, a; \theta)$ where $\theta$ is the parameter of the DQN. The DQN may have a training algorithm similar to the above. That is, for each training iteration i, the input may be the state-action pair (s,a) and the output may be the Q-value for the given (s,a). The loss function $E[(y_i - Q(s,a; \theta))^2]$ may be calculated using $y_i = E[r + \gamma \max_{a'} Q(s',a'; \theta_{i-1})]$ using the same Q-network using old weights to generate the output. The set of actions, in some aspects, may be the possible modes the network can operate in such that the overall system performance is maximized while keeping the interference level low. This may automate the learning of the environment along with the actions that optimize the system objective.

Beyond interference reduction, in addition the CIRN node may employ machine-learning to discover and understand the topology of other teams. In each network, nodes may be present from multiple teams, with the nodes having different roles (e.g., a relay node vs. end node). A gateway, moreover, may be considered a special node in the network. Since the relay node helps to forward packets for other nodes within the same team, the relay node typically has more traffic than the end node. The gateway may have the highest traffic volume as the gateway is the sink/source point of traffic. In addition, the role or functionality of each node may depend on the location of the node in the network—e.g., not all the nodes may be able to act as a relay. For example, a node that is far away from the gateway may be unable to act as a relay node. Thus, a node that cannot reach the gateway within a single hop may choose a relay among multiple other nodes.

Discovery may include the desire of a team in the network to determine the topology of all nodes in the network and the roles of all nodes in the network through a machine-learning algorithm rather than through a collaboration channel. In other aspects, the topological and role information may be obtained through the collaboration channel in a manner similar to that described above.

Figure 13:
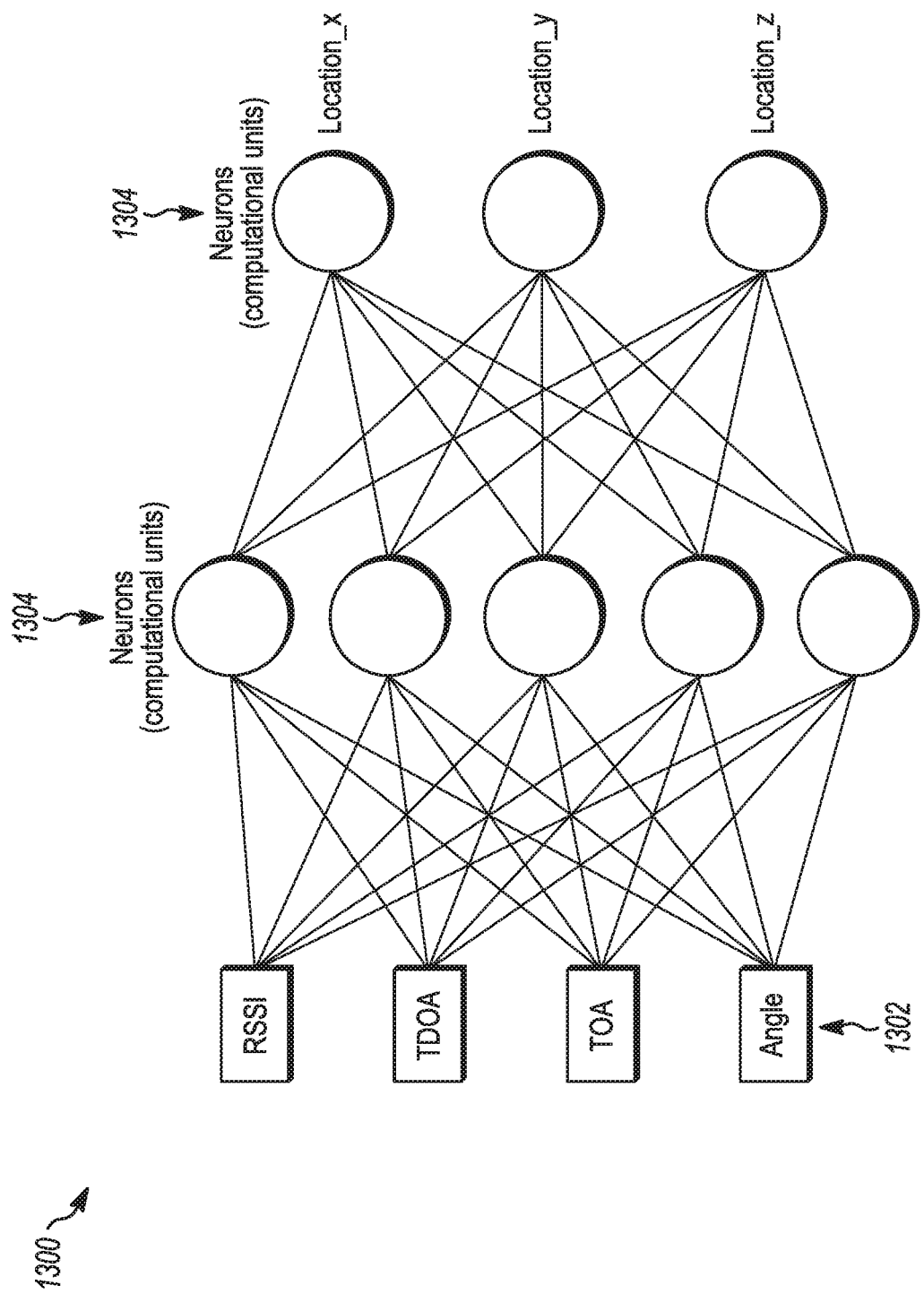
FIG. 13 illustrates a supervised neural network in accordance with some aspects.

FIG. 13 illustrates a supervised neural network in accordance with some aspects. The supervised neural network 1300 may include inputs 1302 and computational units 1304. To learn the role of the nodes, each node in the network may measure one or more of the inputs 1302. The inputs 1302, as shown in FIG. 13, may include the received signal strength indicator (RSSI), a time of arrival (TOA) and a time difference of arrival (TDOA), among others. Nodes within the same team may share the collected information and also their own locations as anchors. As shown in FIG. 13, the supervised neural network 1300 can be trained to estimate the location of other nodes from a different team in the same network. In some aspects, each team may generate a topology map after the discovery phase.

After generation of the topology map, each team may determine the node roles within the network. In some aspects, this may be through explicit information: nodes in the network may listen to the collaboration channel and collect the traffic pattern of other nodes in other teams. The nodes may, for example, identify whether a particular node consistently becomes active following the transmission of the other node. By combining this information with the learned topology of the nodes, a team may learn the roles of nodes from different teams.

Figure 14:
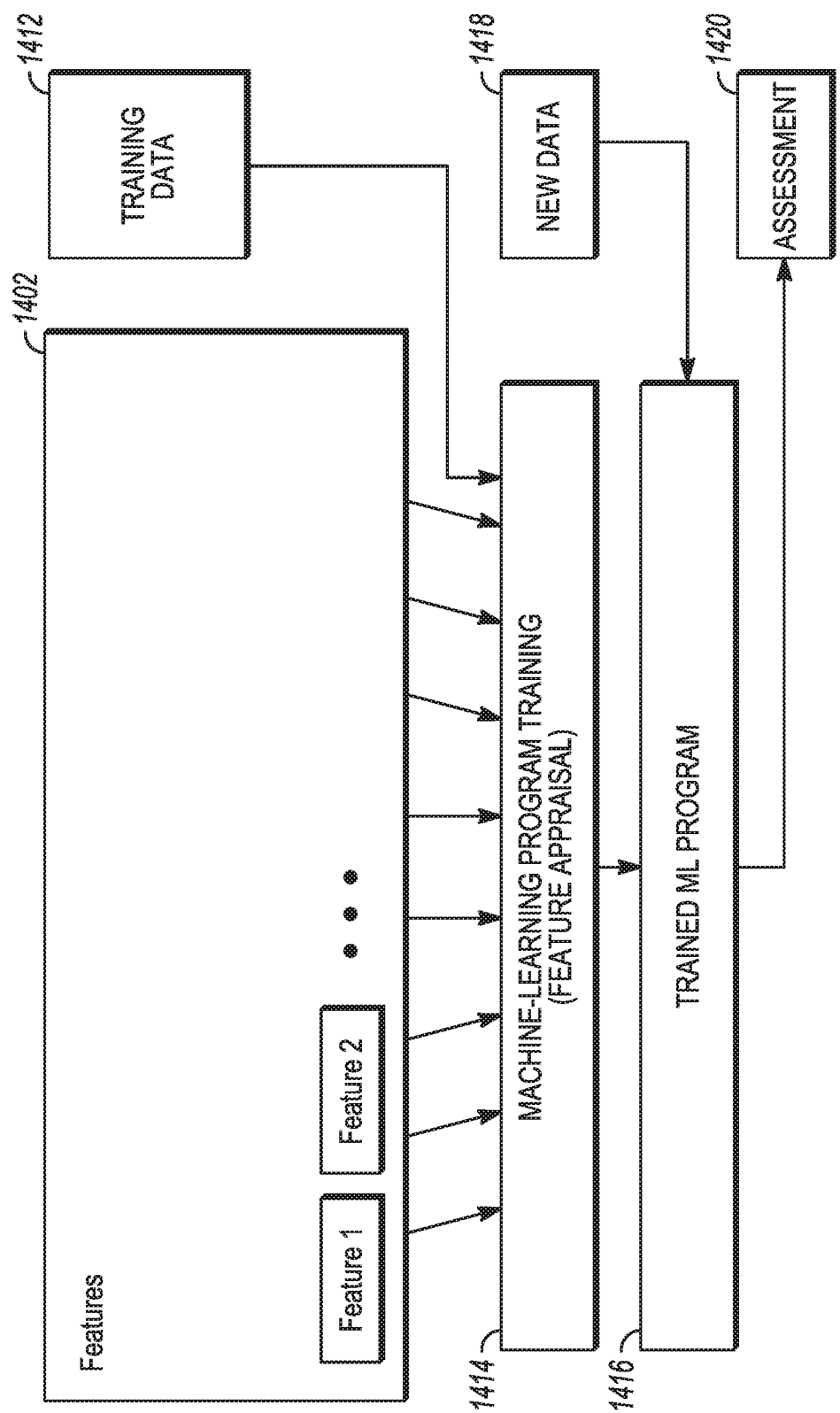
FIG. 14 illustrates the training and use of a machine-learning algorithm in accordance with some aspects.

Turning to machine-learning, FIG. 14 illustrates the training and use of a machine-learning algorithm in accordance with some aspects. Machine-learning algorithms may be utilized to perform operations associated with neighboring networks. Machine-learning is a field of study that gives computers the ability to learn without being explicitly programmed. Machine-learning explores the study and construction of algorithms, also referred to herein as tools, that may learn from existing data and make predictions about new data. Such machine-learning tools operate by building a model from example training data 1412 to make data-driven predictions or decisions expressed as outputs or assessments 1420.

Although neural networks (NNs) are discussed above, other machine-learning tools may be used to determine node behavior as indicated above. For example, Logistic Regression (LR), Naive-Bayes, Random Forest (RF), matrix factorization, and Support Vector Machines (SVM) tools may be used.

Two common types of problems in machine-learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). The machine-learning algorithms utilize the training data 1412 to find correlations among identified features 1402 that affect the outcome.

The machine-learning algorithms utilize features 1402 for analyzing the data to generate assessments 1420. A feature 1402 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

The machine-learning algorithms utilize the training data 1412 to find correlations among the identified features 1402 that affect the outcome or assessment 1420. In some example embodiments, the training data 1412 includes labeled data, which is known data for one or more identified features 1402 and one or more outcomes, such as the amount of interference, modulation type or RSSI (or other signal measurement).

With the training data 1412 and the identified features 1402, the machine-learning tool is trained at operation 1414, The machine-learning tool appraises the value of the features 1402 as they correlate to the training data 1412. The result of the training is the trained machine-learning program 1416.

When the machine-learning program 1416 is used to perform art assessment, new data 1418 is provided as an input to the trained machine-learning program 1416, and the machine-learning program 1416 generates the assessment 1420 as output.

Machine-learning techniques train models to accurately make predictions on data fed into the models (e.g., I-Q samples). During a learning phase, the models are developed against a training dataset of inputs to optimize the models to correctly predict the output for a given input. Generally, as above, the learning phase may be supervised or unsupervised. In addition, the learning phase may be semi-supervised. The various levels of supervision indicate a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to reline its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine-learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine-learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials of a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some aspects, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

In some aspects, the model includes, or is trained by, a neural network (e.g., deep learning, deep convolutional, or recurrent neural network), which comprises a series of "neurons," such as Long Short Term Memory (LSTM) nodes, arranged into a network. A neuron is an architectural element used in data processing and artificial intelligence, particularly machine-learning, that includes memory that may determine when to "remember" and when to "forget" values held in that memory based on the weights of inputs provided to the given neuron. Each of the neurons used herein are configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance are related to one another.

For example, an LSTM serving as a neuron includes several gates to handle input vectors, a memory cell, and an output vector, as provided above in relation to FIGS. 7-12. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

As indicated in more detail above, neural networks utilize features for analyzing the data to generate assessments. A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

In some aspects, for example, different machine-learning algorithms may be used to learn about different features of the transmissions, such as FEC coding or modulation order. The different machine-learning algorithms may be grouped into layers. Algorithms in the $K^{th}$ layer can improve their learning capabilities by using information extracted in algorithms belonging to each the layers up to the $K-1^{th}$ layer. For example, layer 1 may first detect the digital modulation of I-Q signals, in layer 2 the machine-learning algorithms may detect the modulation order using the I-Q signals assuming detection of a particular digital modulation, and in layer 3, FEC coding scheme is detected based on knowledge obtained from the received I-Q signals and previous layers. Heterogeneous cascaded machine-learning stages may allow optimized performance of each layer to a specific type of classification problem as each stage has local input and output and trained for a unique feature classification. For example, training of a particular stage may be undertaken in situations in which new features in the received wireless signal have appeared.

The cascaded machine-learning algorithms permits modification of the inputs of the neural network to be implemented to permit accurate determination of the modulation order, as the determination can vary depending on the modulation technique (e.g., OFDM, SCFDM). For example, operation in the frequency domain may be used for OFDM modulation. In addition, as cyclic prefixes are used in an OFDM system, autocorrelation of the I-Q signal may be an input to the neural network as such autocorrection would yield periodic spikes spaced at the OFDM symbol durations. Other inputs may include but not limited to: time domain I-Q samples, FFT of the input signal, autocorrelation function of the input signal, wavelet coefficients of the input signal (e.g. Haar wavelets, Dabauchies wavelet), and wavelet coefficients of the FFT of the input signal. Projections onto standard codes (e. Walsh-Hadamard codes) can help identify CDMA-like schemes in which the signal is modulated over a code. The former wavelet coefficients may provide an indication of time domain modulation and frequency domain modulation techniques, since they are time-frequency localized basis projections, while the latter be wavelet coefficients may useful to detect frequency hopping modulation schemes (e.g., frequency hopped spread spectrum as they are localized in frequency).

EXAMPLES

Example 1 is an apparatus of a collaborative intelligent radio network (CIRN) node, the apparatus comprising: processing circuitry arranged to: identify whether the CIRN node is within transmission range of a source node of a transmission and within reception range of a destination node of the transmission, the source and destination nodes in a neighboring network from a CIRN network of the CIRN node; schedule a relay of the transmission to the destination node in response to a determination that a relay mode is to relay the transmission, wherein the schedule takes into account performance measurement of the CIRN network and collaboration feedback of performance measurement of the neighboring network; and a memory configured to store at least one machine-learning algorithm to learn how transmissions of the CIRN node impact transmissions of the source and destination node, minimize interference in the neighboring network, or discover and determine topology of the neighboring network.

In Example 2, the subject matter of Example 1 includes, wherein the processing circuitry is further configured to base the schedule on an explicit reward-based mechanism in which the CIRN node advertises in a collaboration channel for a price, the price comprising at least one of a number of time slots the neighboring network is to remain silent, a reduction in transmit power by at least one of the source or destination node, or an offer by the neighboring network to relay packets for the CIRN network.

In Example 3, the subject matter of Examples 1-2 includes, wherein the processing circuitry is further configured to base the schedule on an implicit reward-based mechanism in which the processing circuitry is configured to use a scheduling algorithm whose action space is all possible scheduling choices and reward is network throughput, the network throughput being a weighted sum of throughput of the CIRN network combined with a number of successful transmissions the CIRN node overhears.

In Example 4, the subject matter of Example 3 includes, wherein the scheduling algorithm comprises a determination of a collaboration score that includes measured performance of both the CIRN network and the neighboring network, the performance of the CIRN network and of the neighboring network dependent on whether a particular packet is successfully transmitted.

In Example 5, the subject matter of Example 4 includes, wherein the scheduling algorithm selects, for a particular interval, the relay mode based on a determination of a probability of successful transmission of the particular packet multiplied by the collaboration score for successful transmission and a probability of unsuccessful transmission of the particular packet multiplied by the collaboration score for unsuccessful transmission.

In Example 6, the subject matter of Example 5 includes, wherein the scheduling algorithm updates the probability of successful transmission after the particular interval.

In Example 7, the subject matter of Examples 1-6 includes, wherein the processing circuitry is further configured to identify whether the CIRN node is within transmission range of the source and destination nodes dependent on whether an identification of both the source and destination nodes is indicated in a collaboration channel.

In Example 8, the subject matter of Examples 1-7 includes, wherein the processing circuitry is further configured to identify whether the CIRN node is within transmission range of the source and destination nodes dependent on implicit identification of whether the CIRN node is within the transmission range of the source node and within the reception range of the destination node is based on a machine-learning classification model that predicts whether packets from the source node belong to the destination node based on the packets, acknowledgments/negative acknowledgments (ACK/NACKs) transmitted in response to the packets, and timing between the packets and the ACK/NACKs.

In Example 9, the subject matter of Example 8 includes, wherein a classification problem of the machine-learning classification model comprises, for each pair of packets, an identification of a source/destination pair if any, the machine-learning classification model comprising a classification procedure that comprises for each packet of each packet pair: a determination of whether the packet is a data packet or an ACK/NACK based on features of the packet, an identification of a transmitting node for the packet, and an identification of a receiving node for the packet.

In Example 10, the subject matter of Examples 1-9 includes, wherein the processing circuitry is further configured to generate, for transmission in a collaboration channel, an indication that the CIRN node is a relay node for the source and destination nodes and thereafter engage in a handshake with the source and destination nodes for subsequent communications between the CIRN node and the source and destination nodes.

In Example 11, the subject matter of Examples 1-10 includes, wherein the processing circuitry is further configured to generate the transmission to the destination node without generation of an indication that the CIRN node is a relay node for the source and destination nodes.

In Example 12, the subject matter of Examples 1-11 includes, wherein the processing circuitry is further configured to detect interference to the source and destination nodes through blind estimation in which at least one of: a particular modulation order from one of the source or destination nodes is determined at a time overlapping a time of transmission from the CIRN node and a predetermined amount of time later, a lower modulation order is determined from the one of the source or destination nodes, or an overall increase in network traffic in the neighboring network is detected after the transmission from the CIRN node through determination of an interference covariance matrix that uses an estimate of an average amount of traffic in the neighboring network before transmission by the CIRN node or a running average of the traffic in the neighboring network.

In Example 13, the subject matter of Examples 1-12 includes, wherein the processing circuitry is further configured to avoid interference to the source and destination nodes through non-blind estimation in which periodicity and duration of a packet transmission, by at least one of the source or destination nodes, is indicated over a collaboration channel prior to transmission by the CIRN node.

In Example 14, the subject matter of Examples 1-13 includes, wherein the processing circuitry is further configured to detect interference to the source and destination nodes through non-blind estimation in which physical layer transmission parameters of a packet transmission, by at least one of the source or destination nodes, is indicated over a collaboration channel prior to transmission by the CIRN node and the physical layer transmission parameters used to estimate the interference caused by transmission by the CIRN node through a change in the physical layer transmission parameters in a subsequent packet transmission by the at least one of the source or destination nodes.

In Example 15, the subject matter of Examples 1-14 includes, wherein the processing circuitry is further configured to detect interference to the source and destination nodes through non-blind estimation in which an amount of interference at at least one of the source or destination nodes, as well as an identity of the at least one of the source or destination nodes, is indicated at different times over a collaboration channel and correlated with transmissions by the CIRN node.

In Example 16, the subject matter of Example 15 includes, wherein the amount of interference is limited to one of: interference associated with delay-sensitive transmissions, or interference associated with a flag indicating a re-transmission by the at least one of the source or destination nodes.

In Example 17, the subject matter of Examples 1-16 includes, wherein the processing circuitry is further configured to avoid interference to the source and destination nodes based on an alert from at least one of the source or destination nodes over a collaboration channel that indicates impending transmission by the at least one of the source or destination nodes of interference-sensitive traffic.

In Example 18, the subject matter of Examples 1-17 includes, wherein the processing circuitry is further configured to detect interference to the source and destination nodes through transmission by the CIRN node of probes and observation of subsequent energy per band in bands used in the neighboring network.

In Example 19, the subject matter of Examples 1-18 includes, wherein: the at least one machine-learning algorithm is configured to train a neural network to take at least one action to maximize rewards to both nodes in the CIRN network and nodes in the neighboring network, the neural network has, for each action, an expected reward that depends on belief states of the nodes in the CERN network and of the source and destination nodes, and the belief states are updated in response to taking a particular action of the at least one action to minimize an error in an actual reward when the at least one action is taken compared to an expected reward when the at least one action is taken.

In Example 20, the subject matter of Example 19 includes, wherein the processing circuitry is further configured to: train the neural network through use of inputs that comprise: I-Q samples of signals from other nodes in the CIRN network and signals from nodes in the neighboring network, and, when a spectrum sensing module is used, features extracted from the signals, outputs of the neural network, and during training of the neural network: use supervised learning for the signals from the other nodes in the CIRN network, and unsupervised learning for the signals from the nodes in the neighboring network.

In Example 21, the subject matter of Example 20 includes, wherein the neural network is configured to detect interference with the source and destination nodes from a change in modulation order of the signals from the nodes in the neighboring network.

In Example 22, the subject matter of Examples 20-21 includes, wherein the neural network is configured to output interference levels caused to the source and destination nodes based on either I-Q data received or an output of the spectrum sensing module, the output of the spectrum sensing module comprising modulation type or a signal strength indicator (RSSI).

In Example 23, the subject matter of Examples 19-22 includes, wherein: the at least one action comprises at least one of: a reduction in transmission power of transmissions from the CIRN node, frequency hopping the transmissions from the CIRN node, or use of a backoff timer to delay the transmissions from the CIRN node, and the rewards comprise at least one of: reduced interference levels at the source and destination nodes, an increase in throughput at the CIRN node, or a reduction in volume of retransmissions by at least one of the source or destination nodes.

In Example 24, the subject matter of Examples 1-23 includes, wherein the processing circuitry is further configured to: train a neural network to estimate a location of other nodes within the CIRN network but in a different team than the CIRN node based on measurements of a received signal strength indicator (RSSI), a time of arrival (TOA) and a time difference of arrival (TDOA) of the other nodes and generate a topology map of the other nodes, and determine a role of the other nodes based on the topology map and traffic pattern of the other nodes.

In Example 25, the subject matter of Examples 1-24 includes, wherein the processing circuitry is further configured to: after a determination that the CIRN node is within the transmission range of the source node and within the reception range of the destination node, determine the relay mode of the CIRN node, the relay mode comprising an amplify-and-forward mode, a decode-and-forward mode and a non-relay mode.

In Example 26, the subject matter of Examples 1-25 includes, wherein the processing circuitry comprises: a baseband processor configured to encode transmissions to, and decode transmissions from, the source and destination nodes.

Example 27 is a method of implementing machine-learning in collaborative networks (CIRNs), the method comprising: identifying whether a CIRN node is within transmission range of a source node of a transmission and within reception range of a destination node of the transmission, the CIRN node in a first network and the source and destination nodes in a second network different from the first network; detecting interference caused by the CIRN node to the source and destination nodes; training a neural network to take at least one action to maximize rewards to nodes in the first and second network, the at least one action corresponding to interference avoidance at the nodes in the first and second network and the rewards corresponding to at least one of reduced interference levels in at least one of the first or second network, an increase in throughput at the CIRN node, or a reduction in volume of retransmissions by the nodes in the at least one of the first or second network; determining whether to act as a relay for the source and destination nodes; and in response to determining to act as the relay scheduling relaying of the transmission to the destination node, wherein the scheduling takes into account performance of the first and second network including transmission success rates in the first and second network.

In Example 28, the subject matter of Example 27 includes, wherein: the scheduling is based on a machine-learning scheduling algorithm, an action space of the scheduling algorithm is all possible scheduling choices and a reward of the scheduling algorithm is network throughput, the network throughput is a weighted sum of throughput of the first network combined with a number of successful transmissions the CIRN node overhears, and the scheduling algorithm selects a relay mode of the CIRN node based on a determination of a probability of successful transmission of a particular packet multiplied by a collaboration score for successful transmission and a probability of unsuccessful transmission of the particular packet multiplied by a collaboration score for unsuccessful transmission.

Example 29 is a computer-readable storage medium that stores instructions for execution by one or more processors of a collaborative network (CIRN) node, the one or more processors to configure the CIRN node to, when the instructions are executed: identify whether the CIRN node is within transmission range of a source node of a transmission and within reception range of a destination node of the transmission via explicit information or a machine-teaming classification model, the CIRN node in a first network and the source and destination nodes in a second network different from the first network; train a neural network to take at least one action to maximize rewards to nodes in the first and second network, the at least one action corresponding to interference avoidance at the nodes in the first and second network and the rewards corresponding to at least one of reduced interference levels in at least one of the first or second network, an increase in throughput at the CIRN node, or a reduction in volume of retransmissions by the nodes in the at least one of the first or second network; and determine a relay mode related to transmissions between the source and destination nodes based on a machine-teaming scheduling algorithm that has an action space of all possible scheduling choices and a reward of network throughput.

In Example 30, the subject matter of Example 29 includes, wherein: the network throughput is a weighted sum of throughput of the first network combined with a number of successful transmissions the CIRN node overhears, and the scheduling algorithm selects the relay mode based on a determination of a probability of successful transmission of a particular packet multiplied by a collaboration score for successful transmission and a probability of unsuccessful transmission of the particular packet multiplied by a collaboration score for unsuccessful transmission.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus of a collaborative intelligent radio network (CIRN) node, the apparatus comprising:
  processing circuitry arranged to:
    identify whether the CIRN node is within transmission range of a source node of a transmission and within reception range of a destination node of the transmission, the source and destination nodes in a neighboring network from a CIRN network of the CIRN node;
    schedule a relay of the transmission to the destination node in response to a determination that a relay mode is to relay the transmission, wherein the schedule takes into account performance measurement of the CIRN network and collaboration feedback of performance measurement of the neighboring network; and
  a memory configured to store at least one machine-learning algorithm to learn how transmissions of the CIRN node impact transmissions of the source and destination node, minimize interference in the neighboring network, or discover and determine topology of the neighboring network.

2. The apparatus of claim 1, wherein the processing circuitry is further configured to base the schedule on an explicit reward-based mechanism in which the CIRN node advertises in a collaboration channel for a price, the price comprising at least one of a number of time slots the neighboring network is to remain silent, a reduction in transmit power by at least one of the source or destination node, or an offer by the neighboring network to relay packets for the CIRN network.

3. The apparatus of claim 1, wherein the processing circuitry is further configured to base the schedule on an implicit reward-based mechanism in which the processing circuitry is configured to use a scheduling algorithm whose action space is all possible scheduling choices and reward is network throughput, the network throughput being a weighted sum of throughput of the CIRN network combined with a number of successful transmissions the CIRN node overhears.

4. The apparatus of claim 3, wherein at least one of:
  the scheduling algorithm comprises a determination of a collaboration score that includes measured performance of both the CIRN network and the neighboring network, the performance of the CIRN network and of the neighboring network dependent on whether a particular packet is successfully transmitted,
  the scheduling algorithm selects, for a particular interval, the relay mode based on a determination of a probability of successful transmission of the particular packet multiplied by a collaboration score for successful transmission and a probability of unsuccessful transmission of the particular packet multiplied by a collaboration score for unsuccessful transmission, or
  the scheduling algorithm updates the probability of successful transmission after the particular interval.

5. The apparatus of claim 1, wherein the processing circuitry is further configured to identify whether the CIRN node is within transmission range of the source and destination nodes dependent on whether an identification of both the source and destination nodes is indicated in a collaboration channel.

6. The apparatus of claim 1, wherein the processing circuitry is further configured to identify whether the CIRN node is within transmission range of the source and destination nodes dependent on implicit identification of whether the CIRN node is within the transmission range of the source node and within the reception range of the destination node is based on a machine-learning classification model that predicts whether packets from the source node belong to the destination node based on the packets, acknowledgments/negative acknowledgments (ACK/NACKs) transmitted in response to the packets, and timing between the packets and the ACK/NACKs.

7. The apparatus of claim 6, wherein a classification problem of the machine-learning classification model comprises, for each pair of packets, an identification of a source/destination pair if any, the machine-learning classification model comprising a classification procedure that comprises for each packet of each packet pair:
  a determination of whether the packet is a data packet or an ACK/NACK based on features of the packet,
  an identification of a transmitting node for the packet, and
  an identification of a receiving node for the packet.

8. The apparatus of claim 1, wherein the processing circuitry is further configured to generate, for transmission in a collaboration channel, an indication that the CIRN node is a relay node for the source and destination nodes and thereafter engage in a handshake with the source and destination nodes for subsequent communications between the CIRN node and the source and destination nodes.

9. The apparatus of claim 1, wherein the processing circuitry is further configured to generate the transmission to the destination node without generation of an indication that the CIRN node is a relay node for the source and destination nodes.

10. The apparatus of claim 1, wherein the processing circuitry is further configured to detect interference to the source and destination nodes through blind estimation in which at least one of:
  a particular modulation order from one of the source or destination nodes is determined at a time overlapping a time of transmission from the CIRN node and a predetermined amount of time later, a lower modulation order is determined from the one of the source or destination nodes, or
  an overall increase in network traffic in the neighboring network is detected after the transmission from the CIRN node through determination of an interference covariance matrix that uses an estimate of an average amount of traffic in the neighboring network before transmission by the CIRN node or a running average of the traffic in the neighboring network.

11. The apparatus of claim 1, wherein the processing circuitry is further configured to avoid interference to the source and destination nodes through non-blind estimation in which periodicity and duration of a packet transmission, by at least one of the source or destination nodes, is indicated over a collaboration channel prior to transmission by the CIRN node.

12. The apparatus of claim 1, wherein the processing circuitry is further configured to detect interference to the source and destination nodes through non-blind estimation in which physical layer transmission parameters of a packet transmission, by at least one of the source or destination nodes, is indicated over a collaboration channel prior to transmission by the CIRN node and the physical layer transmission parameters used to estimate the interference caused by transmission by the CIRN node through a change in the physical layer transmission parameters in a subsequent packet transmission by the at least one of the source or destination nodes.

13. The apparatus of claim 1, wherein:
the processing circuitry is further configured to detect interference to the source and destination nodes through non-blind estimation in which an amount of interference at at least one of the source or destination nodes, as well as an identity of the at least one of the source or destination nodes, is indicated at different times over a collaboration channel and correlated with transmissions by the CIRN node, and
the amount of interference is limited to one of:
interference associated with delay-sensitive transmissions, or
interference associated with a flag indicating a re-transmission by the at least one of the source or destination nodes.

14. The apparatus of claim 1, wherein the processing circuitry is further configured to avoid interference to the source and destination nodes based on an alert from at least one of the source or destination nodes over a collaboration channel that indicates impending transmission by the at least one of the source or destination nodes of interference-sensitive traffic.

15. The apparatus of claim 1, wherein the processing circuitry is further configured to detect interference to the source and destination nodes through transmission by the CIRN node of probes and observation of subsequent energy per band in bands used in the neighboring network.

16. The apparatus of claim 1, wherein:
the at least one machine-learning algorithm is configured to train a neural network to take at least one action to maximize rewards to both nodes in the CIRN network and nodes in the neighboring network,
the neural network has, for each action, an expected reward that depends on belief states of the nodes in the CIRN network and of the source and destination nodes, and
the belief states are updated in response to taking a particular action of the at least one action to minimize an error in an actual reward when the at least one action is taken compared to an expected reward when the at least one action is taken.

17. The apparatus of claim 16, wherein the processing circuitry is further configured to:
train the neural network through use of inputs that comprise:
I-Q samples of signals from other nodes in the CIRN network and signals from nodes in the neighboring network, and, when a spectrum sensing module is used, features extracted from the signals, outputs of the neural network, and during training of the neural network:
use supervised learning for the signals from the other nodes in the CIRN network, and
unsupervised learning for the signals from the nodes in the neighboring network.

18. The apparatus of claim 17, wherein the neural network is configured to at least one of:
detect interference with the source and destination nodes from a change in modulation order of the signals from the nodes in the neighboring network, or
output interference levels caused to the source and destination nodes based on either I-Q data received or an output of the spectrum sensing module, the output of the spectrum sensing module comprising modulation type or a signal strength indicator (RSSI).

19. The apparatus of claim 16, wherein:
the at least one action comprises at least one of:
a reduction in transmission power of transmissions from the CIRN node, frequency hopping the transmissions from the CIRN node, or use of a backoff timer to delay the transmissions from the CIRN node, and
the rewards comprise at least one of: reduced interference levels at the source and destination nodes, an increase in throughput at the CIRN node, or a reduction in volume of retransmissions by at least one of the source or destination nodes.

20. The apparatus of claim 1, wherein the processing circuitry is further configured to:
train a neural network to estimate a location of other nodes within the CIRN network but in a different team than the CIRN node based on measurements of a received signal strength indicator (RSSI), a time of arrival (TOA) and a time difference of arrival (TDOA) of the other nodes and generate a topology map of the other nodes, and
determine a role of the other nodes based on the topology map and traffic pattern of the other nodes.

21. The apparatus of claim 1, wherein the processing circuitry is further configured to:
after a determination that the CIRN node is within the transmission range of the source node and within the reception range of the destination node, determine the relay mode of the CIRN node, the relay mode comprising an amplify-and-forward mode, a decode-and-forward mode and a non-relay mode.

22. A method of implementing machine-learning in collaborative networks (CIRNs), the method comprising:
identifying whether a CIRN node is within transmission range of a source node of a transmission and within reception range of a destination node of the transmission, the CIRN node in a first network and the source and destination nodes in a second network different from the first network;
detecting interference caused by the CIRN node to the source and destination nodes;
training a neural network to take at least one action to maximize rewards to nodes in the first and second network, the at least one action corresponding to interference avoidance at the nodes in the first and second network and the rewards corresponding to at least one of reduced interference levels in at least one of the first or second network, an increase in throughput at the CIRN node, or a reduction in volume of retransmissions by the nodes in the at least one of the first or second network;

determining whether to act as a relay for the source and destination nodes; and in response to determining to act as the relay, scheduling relaying of the transmission to the destination node, wherein the scheduling takes into account performance of the first and second network including transmission success rates in the first and second network.

23. The method of claim 22, wherein:

the scheduling is based on a machine-learning scheduling algorithm, an action space of the machine-learning scheduling algorithm is all possible scheduling choices and a reward of the machine-learning scheduling algorithm is network throughput, the network throughput is a weighted sum of throughput of the first network combined with a number of successful transmissions the CIRN node overhears, and the machine-learning scheduling algorithm selects a relay mode of the CIRN node based on a determination of a probability of successful transmission of a particular packet multiplied by a collaboration score for successful transmission and a probability of unsuccessful transmission of the particular packet multiplied by a collaboration score for unsuccessful transmission.

24. A non-transitory computer-readable storage medium that stores instructions for execution by one or more processors of a collaborative network (CIRN) node, the one or more processors to configure the CIRN node to, when the instructions are executed:

identify whether the CIRN node is within transmission range of a source node of a transmission and within reception range of a destination node of the transmission via explicit information or a machine-learning classification model, the CIRN node in a first network and the source and destination nodes in a second network different from the first network;

train a neural network to take at least one action to maximize rewards to nodes in the first and second network, the at least one action corresponding to interference avoidance at the nodes in the first and second network and the rewards corresponding to at least one of reduced interference levels in at least one of the first or second network, an increase in throughput at the CIRN node, or a reduction in volume of retransmissions by the nodes in the at least one of the first or second network; and determine a relay mode related to transmissions between the source and destination nodes based on a machine-learning scheduling algorithm that has an action space of all possible scheduling choices and a reward of network throughput.

25. The medium of claim 24, wherein:

the network throughput is a weighted sum of throughput of the first network combined with a number of successful transmissions the CIRN node overhears, and the machine-learning scheduling algorithm selects the relay mode based on a determination of a probability of successful transmission of a particular packet multiplied by a collaboration score for successful transmission and a probability of unsuccessful transmission of the particular packet multiplied by a collaboration score for unsuccessful transmission.

* * * * *